(12) United States Patent
Meyer et al.

(10) Patent No.: US 10,807,489 B2
(45) Date of Patent: Oct. 20, 2020

(54) SYSTEMS AND METHODS FOR CHARGING AN ONBOARD ENERGY STORAGE DEVICE IN A HYBRID VEHICLE

(71) Applicant: Ford Global Technologies, LLC, Dearborn, MI (US)

(72) Inventors: Jason Meyer, Canton, MI (US); Stan L. Bower, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 437 days.

(21) Appl. No.: 15/891,239

(22) Filed: Feb. 7, 2018

(65) Prior Publication Data
US 2018/0244169 A1  Aug. 30, 2018

Related U.S. Application Data

(60) Provisional application No. 62/464,591, filed on Feb. 28, 2017.

(51) Int. Cl.
| | |
|---|---|
| *B60L 53/60* | (2019.01) |
| *H02J 7/14* | (2006.01) |
| *B60L 58/12* | (2019.01) |
| *B60L 7/18* | (2006.01) |
| *B60L 50/16* | (2019.01) |

(Continued)

(52) U.S. Cl.
CPC .............. *B60L 53/60* (2019.02); *B60L 7/18* (2013.01); *B60L 15/2054* (2013.01); *B60L 50/16* (2019.02); *B60L 58/12* (2019.02); *H02J 7/1446* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2270/142* (2013.01); *B60L 2270/145* (2013.01); *H01M 10/44* (2013.01); *H01M 2220/20* (2013.01); *Y02T 10/6286* (2013.01); *Y02T 10/7005* (2013.01)

(58) Field of Classification Search
CPC .......... B60L 53/60; B60L 50/16; B60L 58/12; H02J 7/18; H02J 7/1446
USPC ....................................................... 320/104
See application file for complete search history.

(56) References Cited

U.S. PATENT DOCUMENTS

| | | |
|---|---|---|
| 8,706,337 B2 | 4/2014 | Rauner et al. |
| 9,086,045 B2 | 7/2015 | Wang et al. |

(Continued)

OTHER PUBLICATIONS

Bower, S. et al., "Systems and Methods for Starting an Engine in a Hybrid Vehicle," U.S. Appl. No. 15/891,268, filed Feb. 7, 2018, 127 pages.

*Primary Examiner* — Nathaniel R Pelton
(74) *Attorney, Agent, or Firm* — David Kelley; McCoy Russell LLP

(57) ABSTRACT

Methods and systems are provided for charging an onboard energy storage device in a hybrid vehicle depending on vehicle operating conditions. In one example, a method includes charging the onboard energy storage device through a dual clutch transmission via an electric machine positioned downstream of the dual clutch transmission, and controlling a driveline disconnect clutch positioned downstream of the electric machine. In this way, charging of the onboard energy storage device may be conducted under conditions where a speed of the vehicle is either above a predetermined threshold speed, or below the predetermined threshold speed.

20 Claims, 22 Drawing Sheets

(51) Int. Cl.
*B60L 15/20* (2006.01)
*H01M 10/44* (2006.01)

(56) References Cited

U.S. PATENT DOCUMENTS

| | | | |
|---|---|---|---|
| 9,399,461 B2 | 7/2016 | Yamazaki et al. | |
| 2007/0278022 A1* | 12/2007 | Tanishima | B60W 10/02 |
| | | | 180/65.285 |
| 2010/0094492 A1* | 4/2010 | Filla | B60L 58/40 |
| | | | 701/22 |
| 2013/0296108 A1 | 11/2013 | Ortmann et al. | |
| 2017/0335816 A1* | 11/2017 | Hao | F02N 11/08 |
| 2018/0105159 A1* | 4/2018 | Park | B60L 15/2054 |
| 2018/0257473 A1* | 9/2018 | Follen | B60L 53/64 |

\* cited by examiner

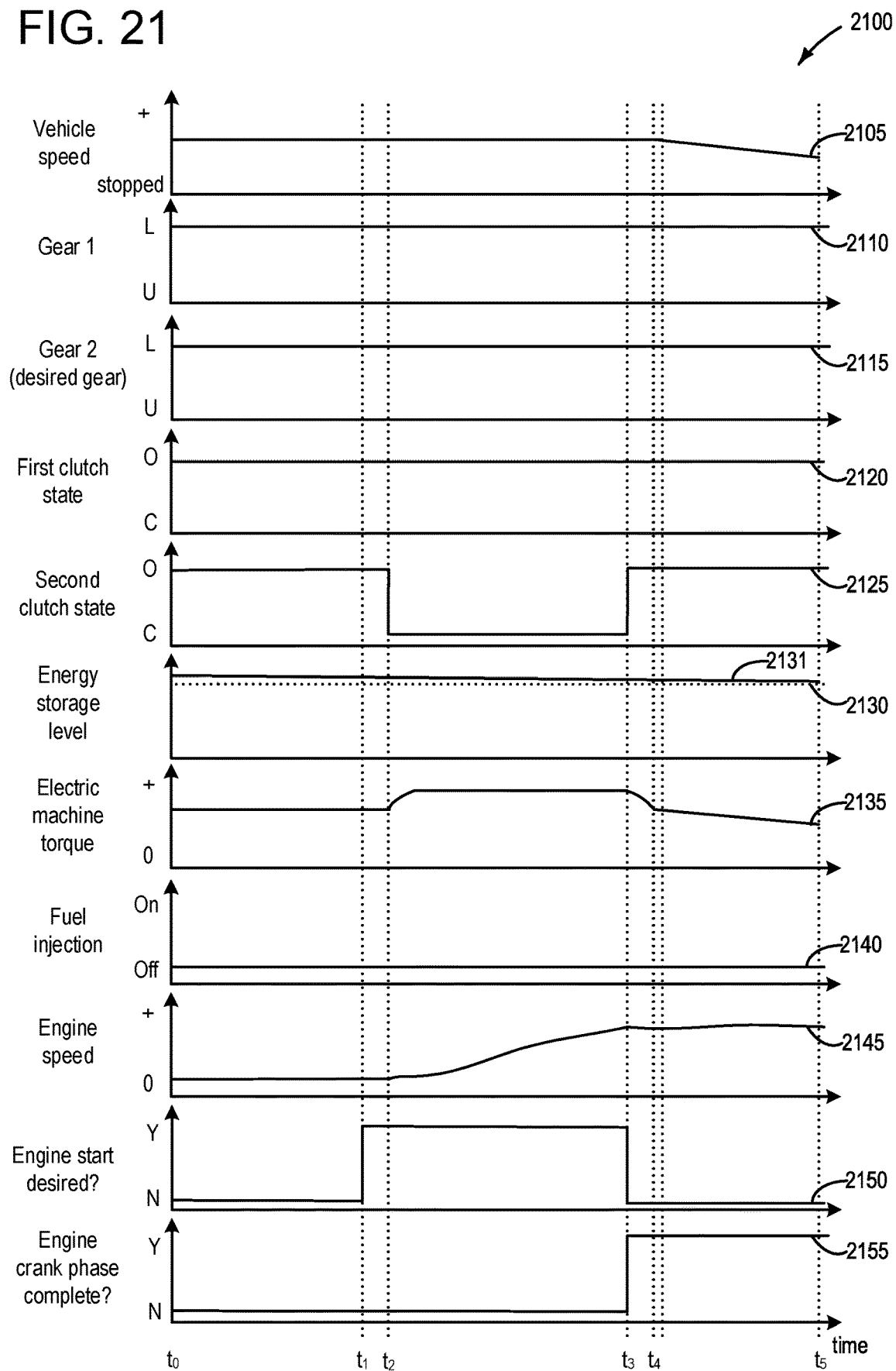

SYSTEMS AND METHODS FOR CHARGING AN ONBOARD ENERGY STORAGE DEVICE IN A HYBRID VEHICLE

CROSS REFERENCE TO RELATED APPLICATION

The present application claims priority to U.S. Provisional Patent Application No. 62/464,591 entitled "Systems and Methods for Charging an Onboard Energy Storage Device in a Hybrid Vehicle," filed on Feb. 28, 2017. The entire contents of the above-referenced application are hereby incorporated by reference in their entirety for all purposes.

FIELD

The present description relates generally to methods and systems for controlling an engine to charge an onboard energy storage device through a dual clutch transmission via an electric machine positioned downstream of the dual clutch transmission.

BACKGROUND/SUMMARY

Hybrid electric vehicles (HEVs) have both an internal combustion engine and an electric motor which can alternately or in combination be used to propel the vehicle. A variety of different drive trains are used in hybrid vehicles. The present application relates to a parallel configuration in which the engine is connected to a dual clutch transmission, and where an electric machine is positioned downstream of the dual clutch transmission.

A problem facing such a vehicle configuration is how to achieve stationary charging or rolling charging of an onboard energy storage device. One solution involves including a dedicated engine starter motor, for example an integrated starter/generator, for conducting charging operations. However, such a solution adds cost, weight, and furthermore, such a dedicated engine starter motor may be limited in its capacity to charge an onboard energy storage device, as compared to a high voltage electric machine. Thus, the inventors herein have developed systems and methods to address such issues. In one example, a method is provided, comprising charging an onboard energy storage device of a vehicle through a dual clutch transmission via an electric machine positioned downstream of the dual clutch transmission by producing a charging torque with an engine positioned upstream of the dual clutch transmission, and controlling a driveline disconnect clutch positioned downstream of the electric machine.

As one example, such a method may include a speed of the vehicle below a predetermined threshold, where the predetermined threshold includes vehicle speed below a synchronous engine idle speed for a first, or lowest, gear of the dual clutch transmission.

In another example, a method is provided, comprising charging an onboard energy storage device of a vehicle through a dual clutch transmission via an electric machine positioned downstream of the dual clutch transmission by producing a charging torque with an engine positioned upstream of the dual clutch transmission and controlling a driveline disconnect clutch positioned downstream of the electric machine, under conditions where a speed of the vehicle is greater than a predetermined threshold. In this way, methods are provided for charging an onboard energy storage device in a hybrid vehicle with a dual clutch transmission positioned downstream of an engine, and where an electric machine is positioned downstream of the dual clutch transmission.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 21 shows an example timeline for conducting an engine start procedure during a lift-pedal event where an onboard energy storage device is not capable of accepting further charge.

DETAILED DESCRIPTION

The following description relates to systems and methods for charging an onboard energy storage device in a hybrid vehicle, and for starting an engine of the hybrid vehicle. FIGS. 1A-3 show an example hybrid vehicle system that includes a driveline with an engine, a dual clutch transmission (DCT), an electric machine that is positioned downstream of the dual clutch transmission, and a driveline disconnect clutch that is positioned downstream of the electric machine. In some examples, the hybrid vehicle system may include an integrated starter/generator for starting the engine, however in other examples, an integrated starter/generator may not be included in the hybrid vehicle system.

Figure 4:
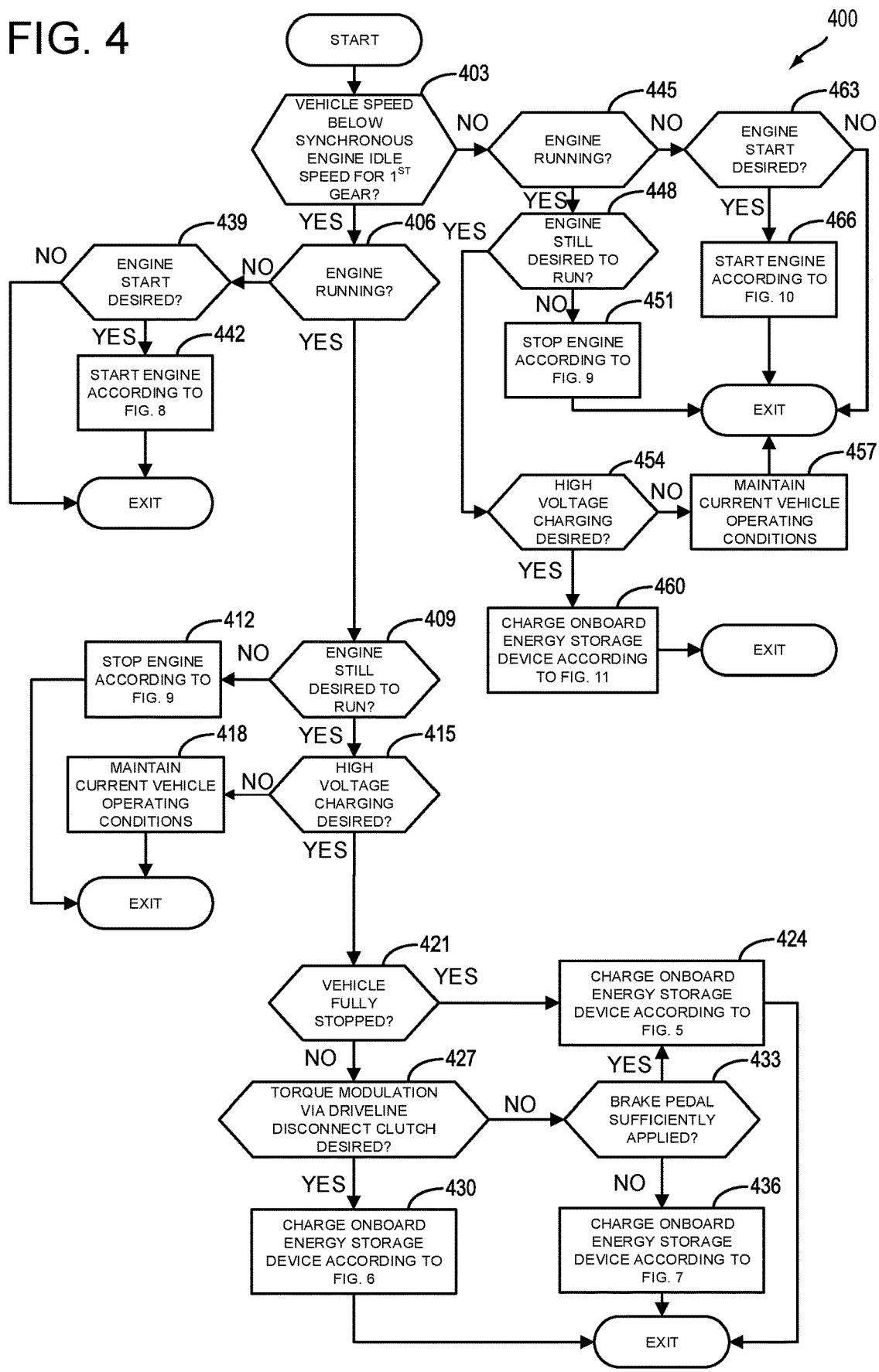
FIG. 4 shows a high-level example method for starting an engine of a vehicle, or charging an onboard energy storage device.
Figure 5:
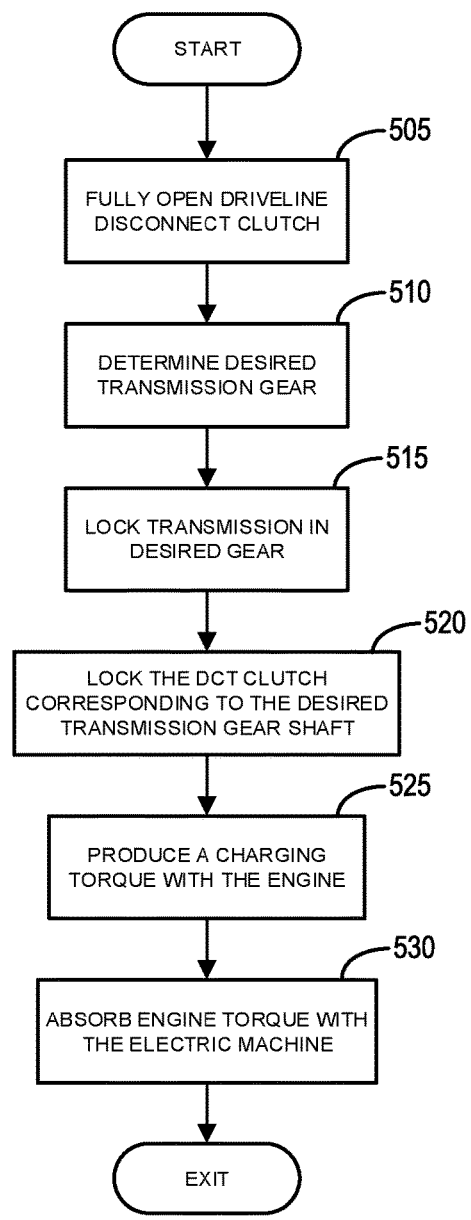
FIG. 5 continues from FIG. 4 and shows a high-level example method for charging the onboard energy storage device when the vehicle is stationary.
Figure 6:
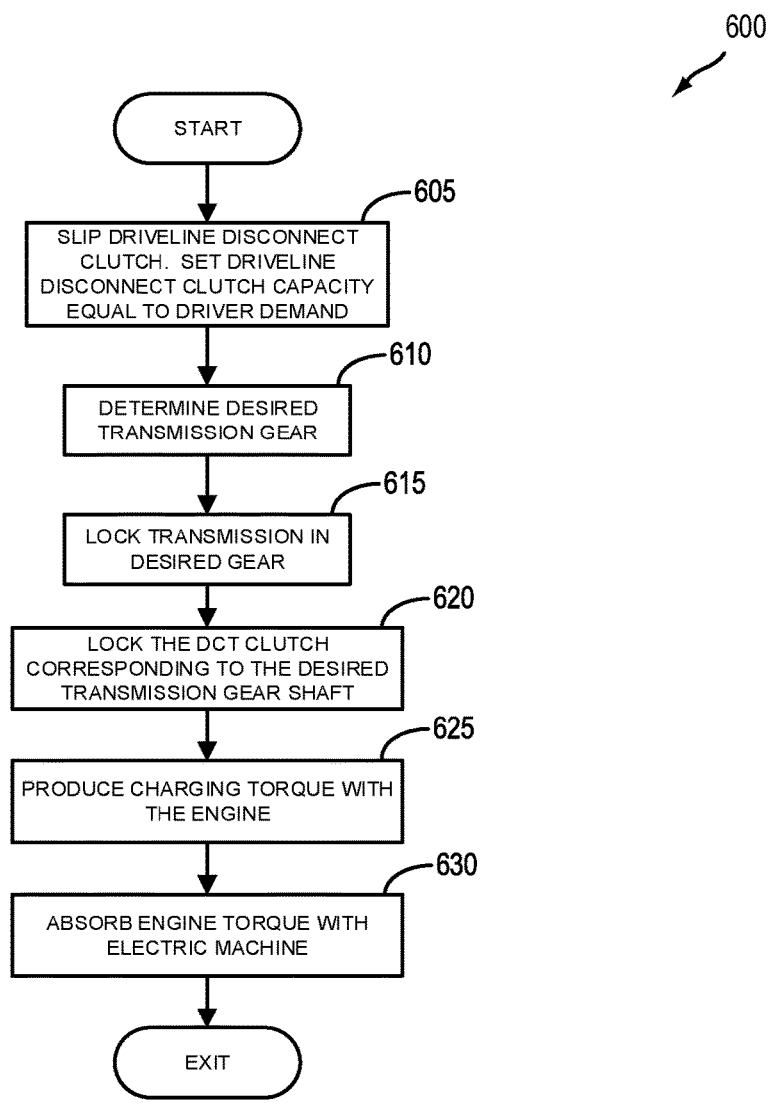
FIG. 6 continues from FIG. 4 and shows a high-level example method for charging the onboard energy storage device when the vehicle is not fully stopped and where torque modulation via a driveline disconnect clutch is requested.
Figure 7:
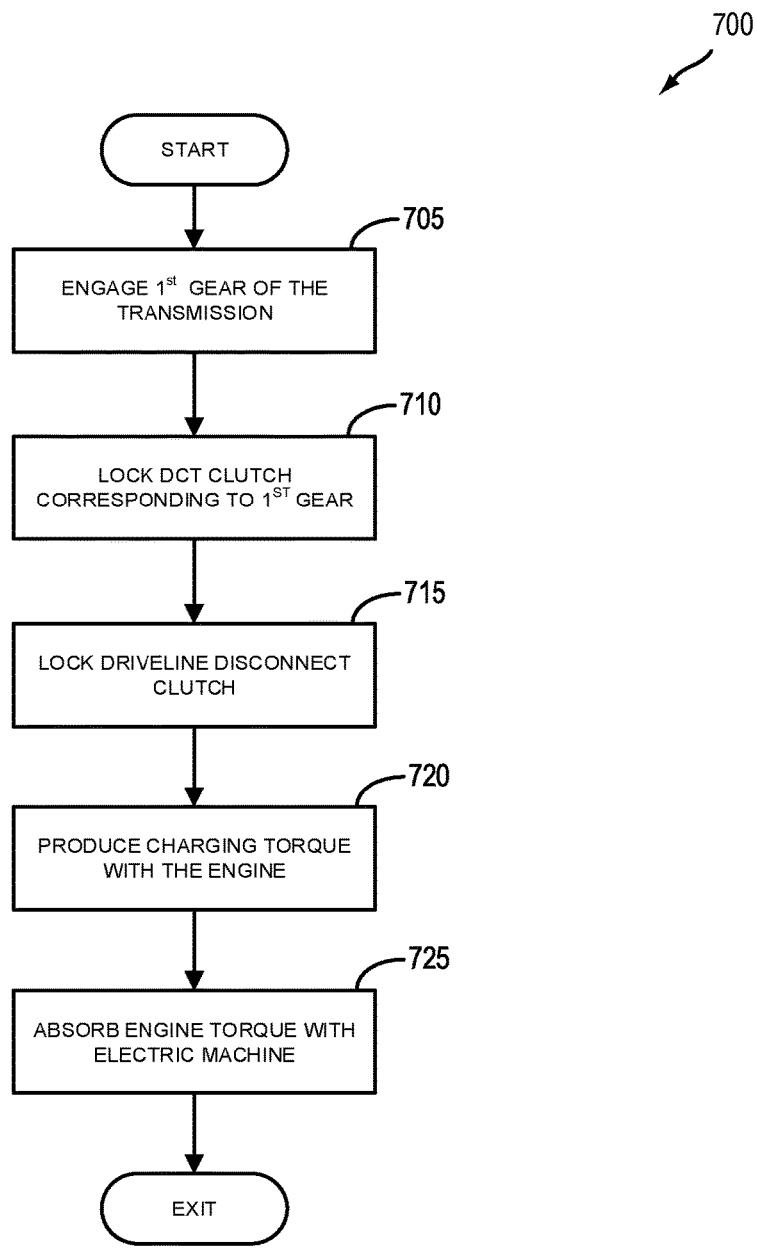
FIG. 7 continues from FIG. 4 and shows a high-level example method for charging the onboard energy storage device when the vehicle is not fully stopped, and where torque modulation via the driveline disconnect clutch is not requested.
Figure 8:
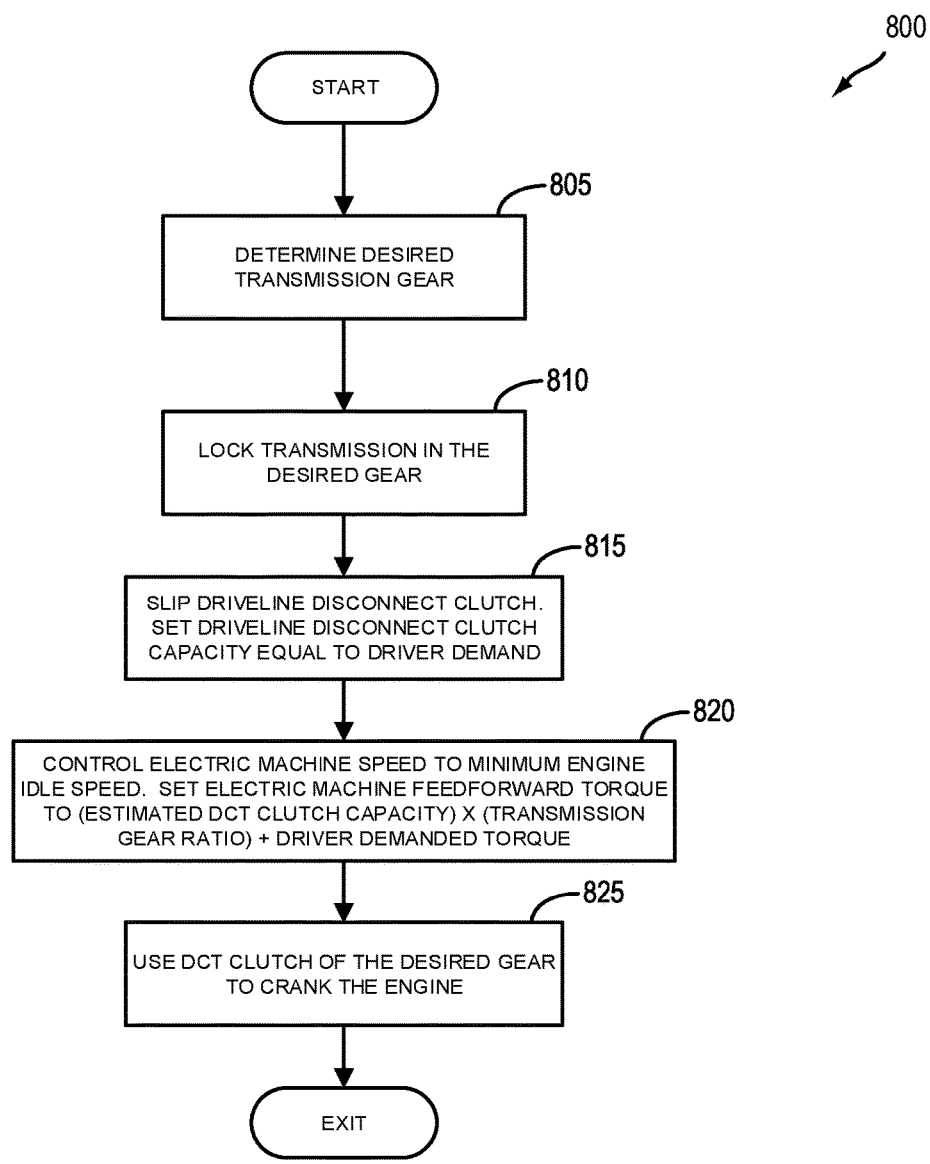
FIG. 8 continues from FIG. 4 and shows a high-level example method for conducting an engine start procedure when vehicle speeds are below a predetermined threshold.
Figure 9:
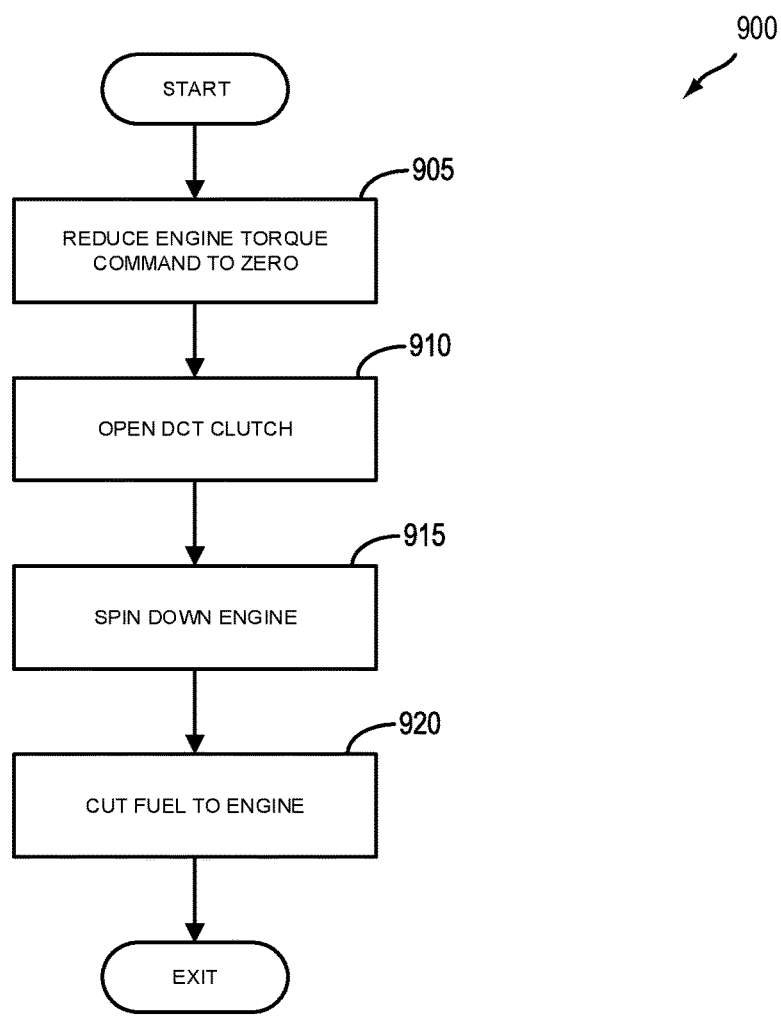
FIG. 9 continues from FIG. 4 and shows a high-level example method for shutting down an engine.
Figure 10:
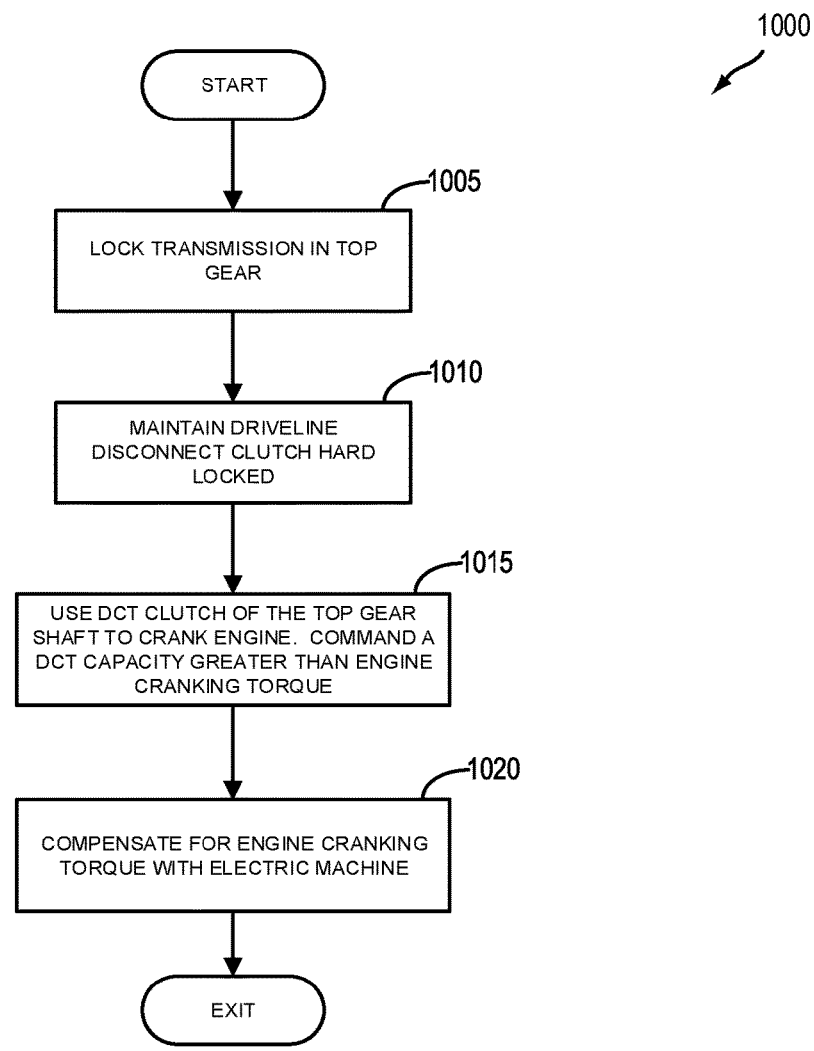
FIG. 10 continues from FIG. 4 and shows a high-level example method for conducting an engine start procedure when vehicle speeds are above a predetermined threshold.
Figure 11:
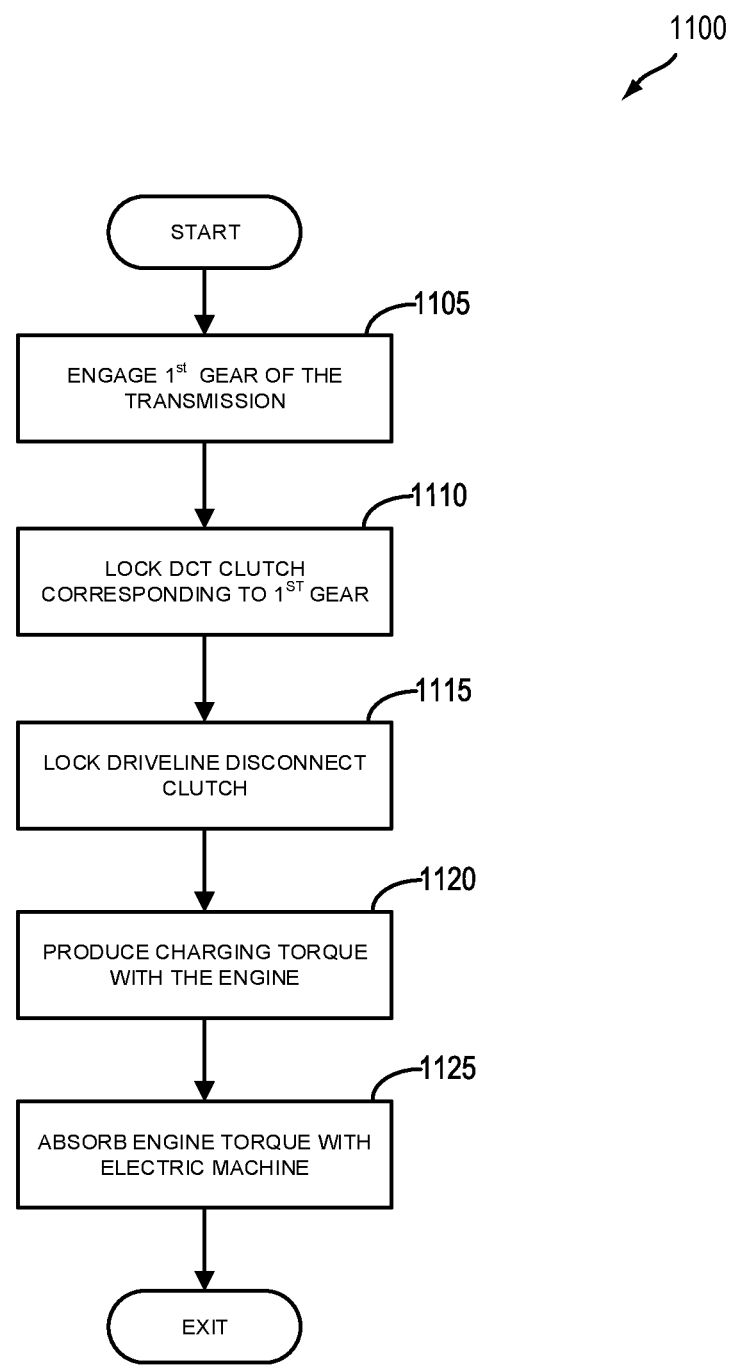
FIG. 11 continues from FIG. 4 and shows a high-level example method for charging the onboard energy storage device when vehicle speeds are above a predetermined threshold.
Figure 12:
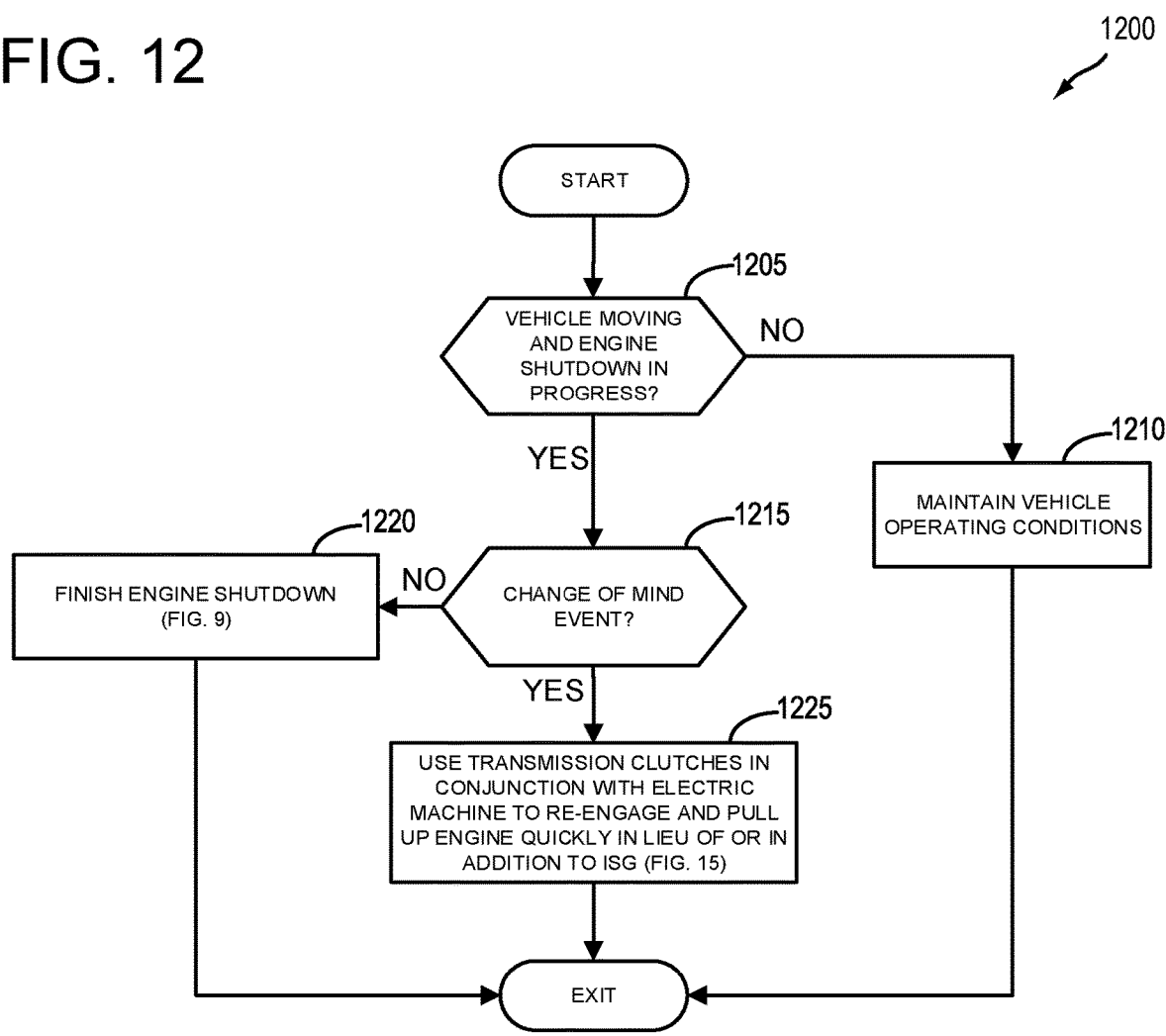
FIG. 12 shows a high-level example method for conducting an engine start in response to a change-of-mind event during an engine shutdown procedure.
Figure 13:
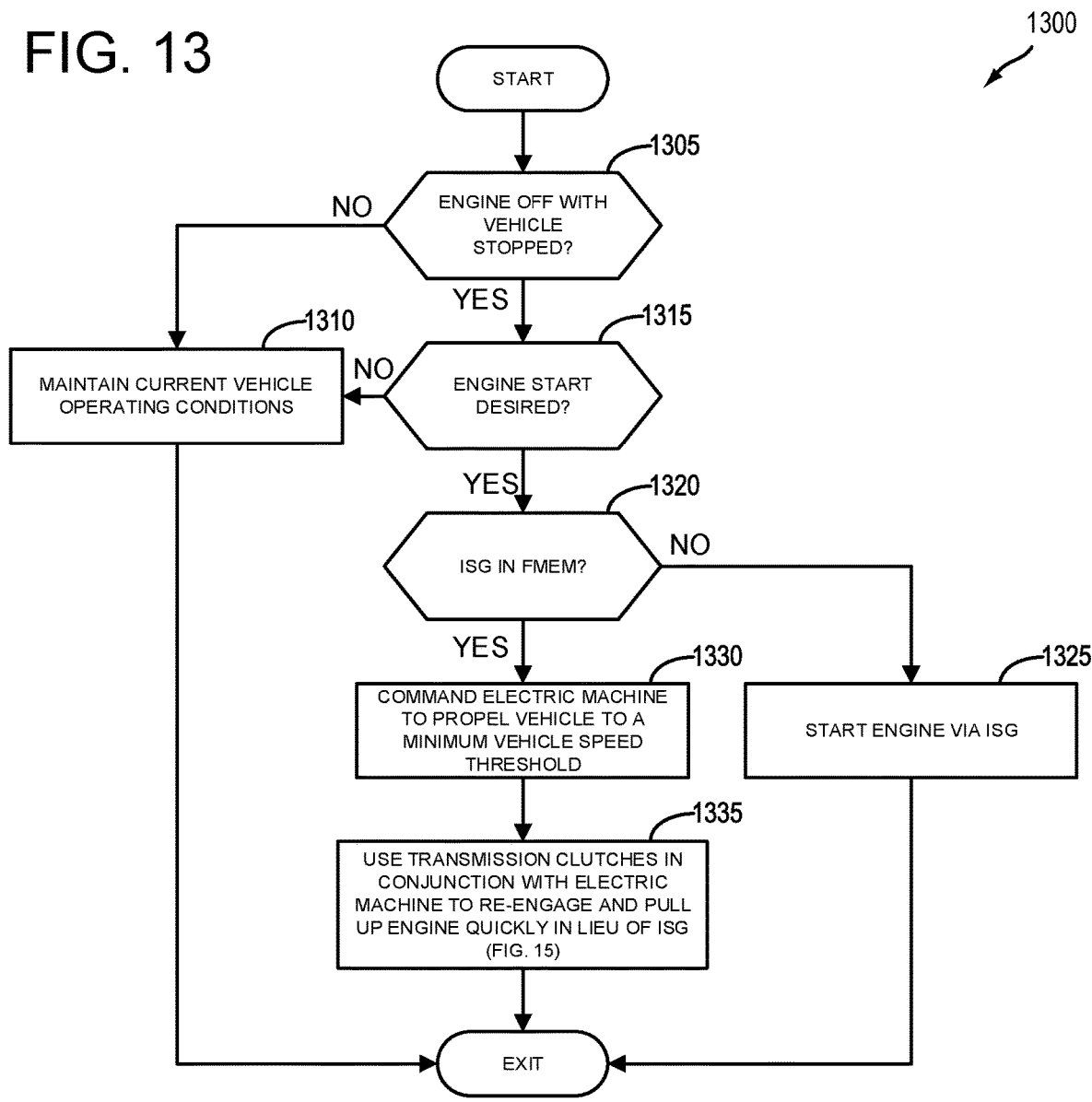
FIG. 13 shows a high-level example method for conducting an engine start under conditions where a dedicated engine starter motor is not functioning as desired.
Figure 14:
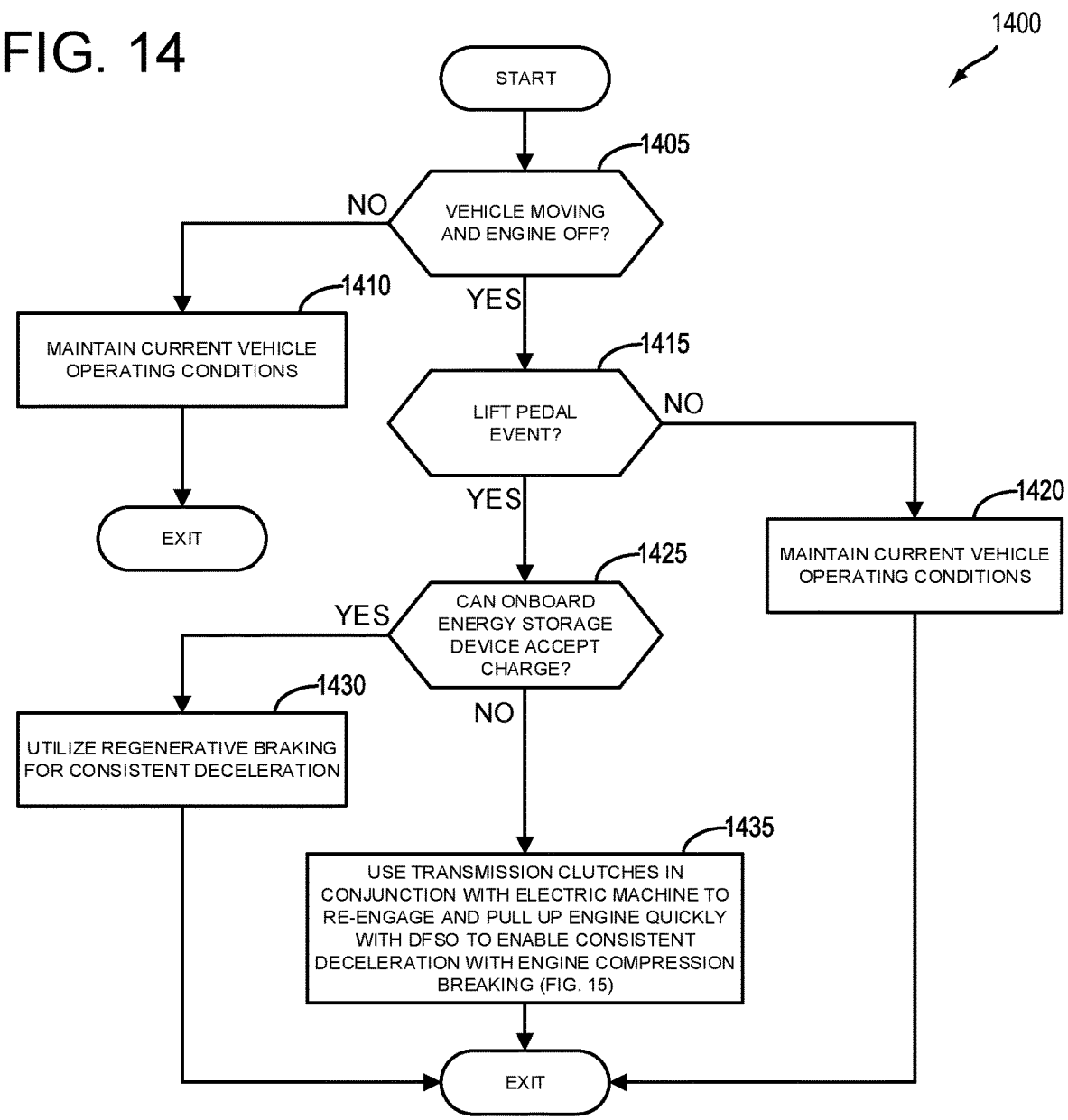
FIG. 14 shows a high-level example method for conducting an engine start during a lift-pedal event where an onboard energy storage device is not capable of accepting further charge.
Figure 15:
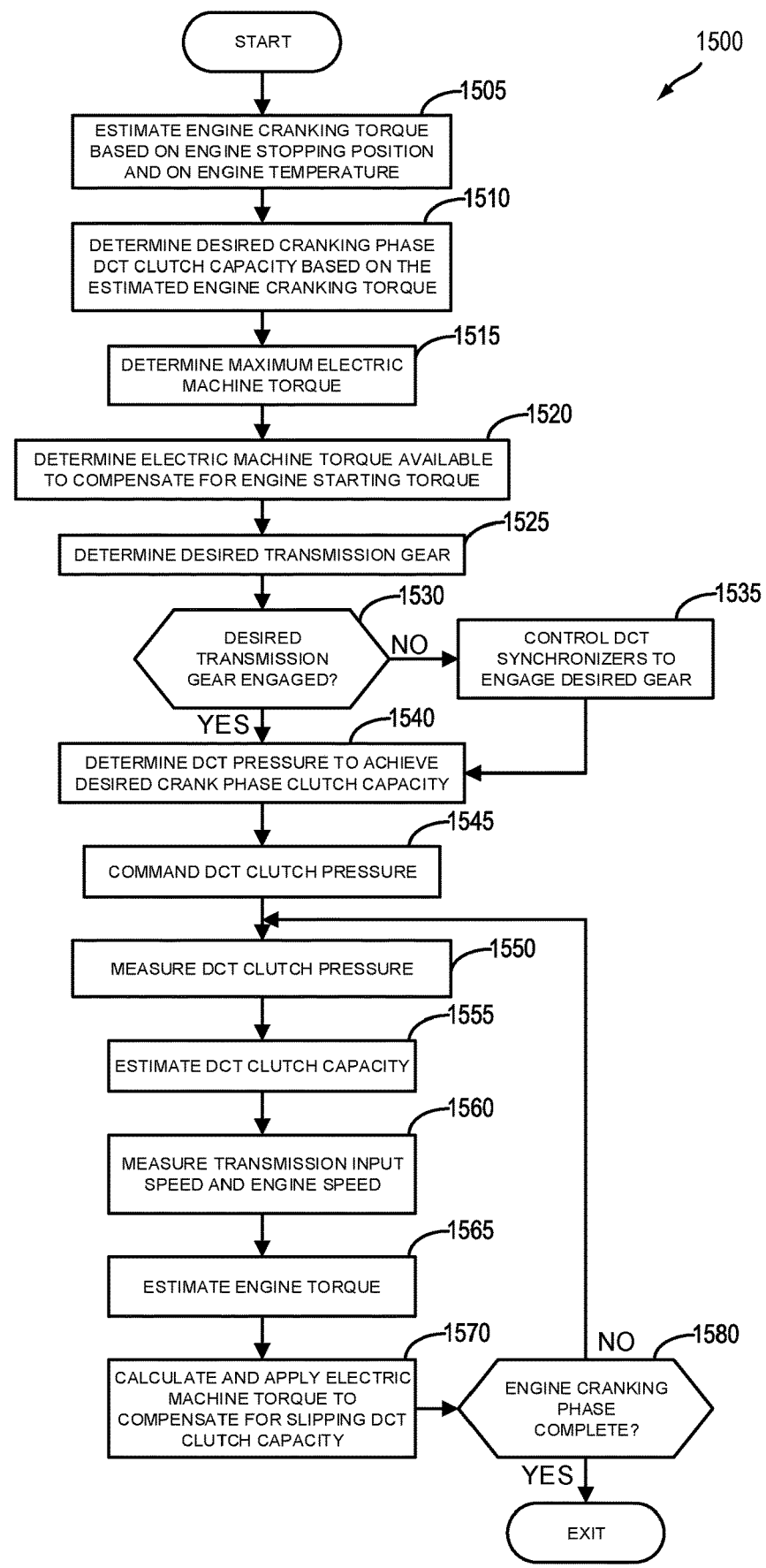
FIG. 15 shows a high-level example method for conducting an engine start procedure.

FIG. 4 depicts a high-level example method for charging the onboard energy storage device, or starting the engine, under various vehicle operation conditions. An example method for charging the onboard energy storage device when the vehicle is stationary, is illustrated at FIG. 5. An example method for charging the onboard energy storage device when the vehicle is not fully stopped and where torque modulation via a driveline disconnect clutch is requested, is depicted at FIG. 6. An example method for charging the onboard energy storage device when the vehicle is not fully stopped, and where torque modulation via the driveline disconnect clutch is not requested, is depicted at FIG. 7. An example method for conducting an engine start procedure when vehicle speeds are below a predetermined threshold, is depicted at FIG. 8. An example method for shutting down the engine is depicted at FIG. 9. An example method for conducting an engine start procedure when vehicle speeds are above a predetermined threshold is depicted at FIG. 10. An example method for charging the onboard energy storage device when vehicle speeds are above a predetermined threshold, is depicted at FIG. 11. An example method for conducting an engine start in response to a change-of-mind event during an engine shutdown procedure, is depicted at FIG. 12. An example method for conducting an engine start under conditions where a dedicated engine starter motor is not functioning as desired, is depicted at FIG. 13. An example method for conducting an engine start during a lift-pedal event where an onboard energy storage device is not capable of accepting further charge, is depicted at FIG. 14. An example method for conducting an engine start, which may comprise a sub-method of each of the methods depicted in FIGS. 12-14, is depicted at FIG. 15.

Figure 16:
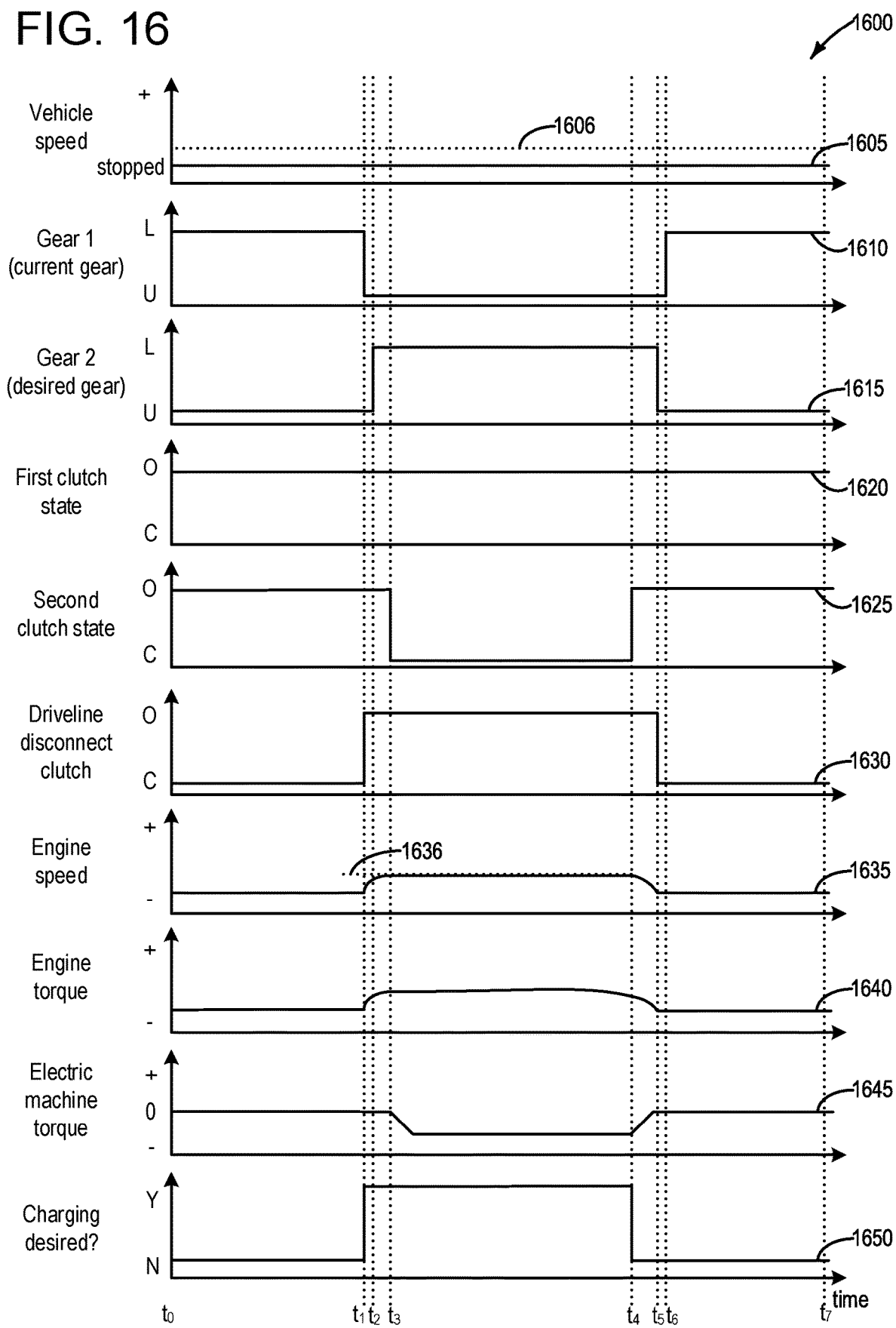
FIG. 16 shows an example timeline for charging the onboard energy storage device when the vehicle is stationary.
Figure 17:
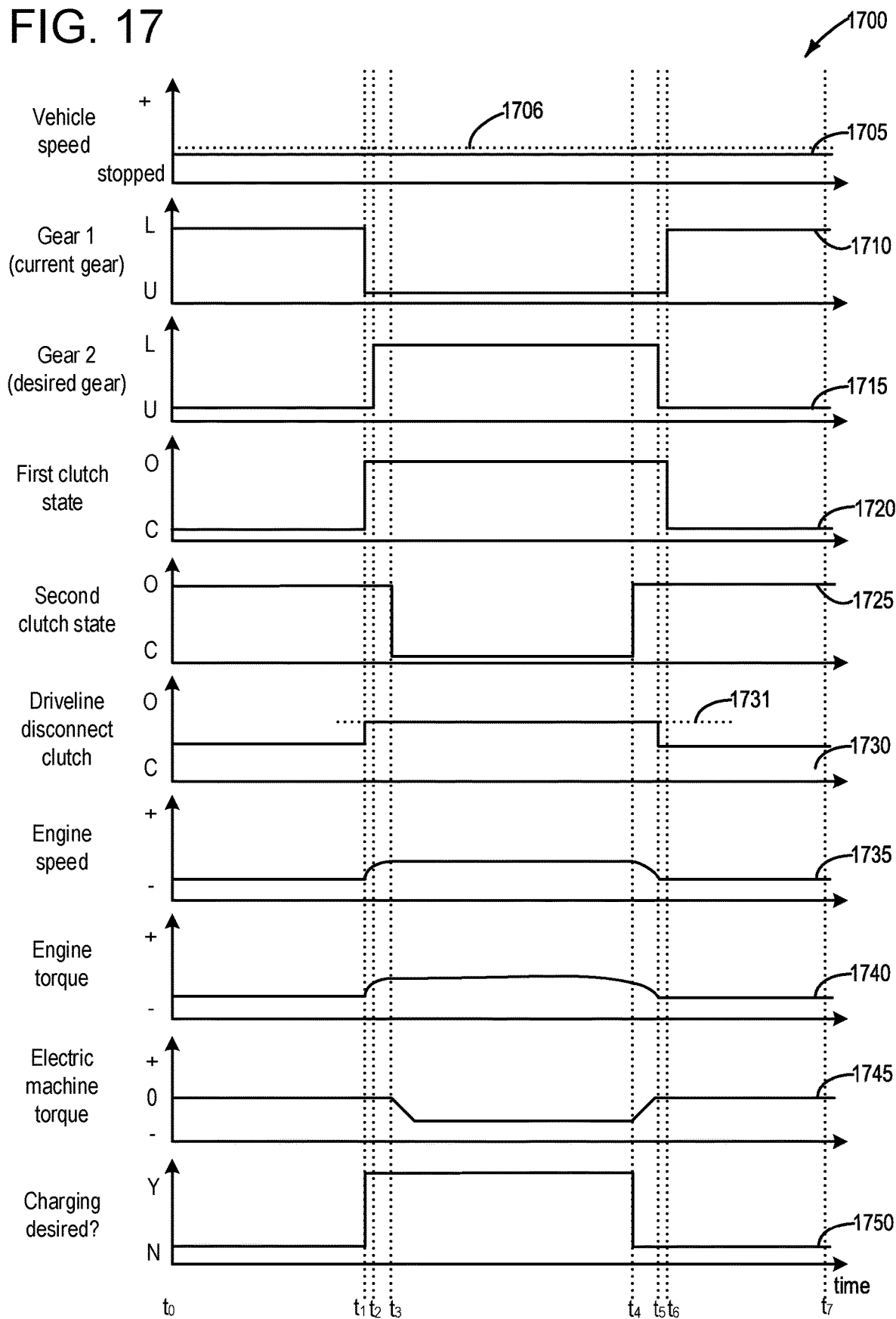
FIG. 17 shows an example timeline for charging the onboard energy storage device when the vehicle is not fully stopped and where torque modulation via a driveline disconnect clutch is requested.
Figure 18:
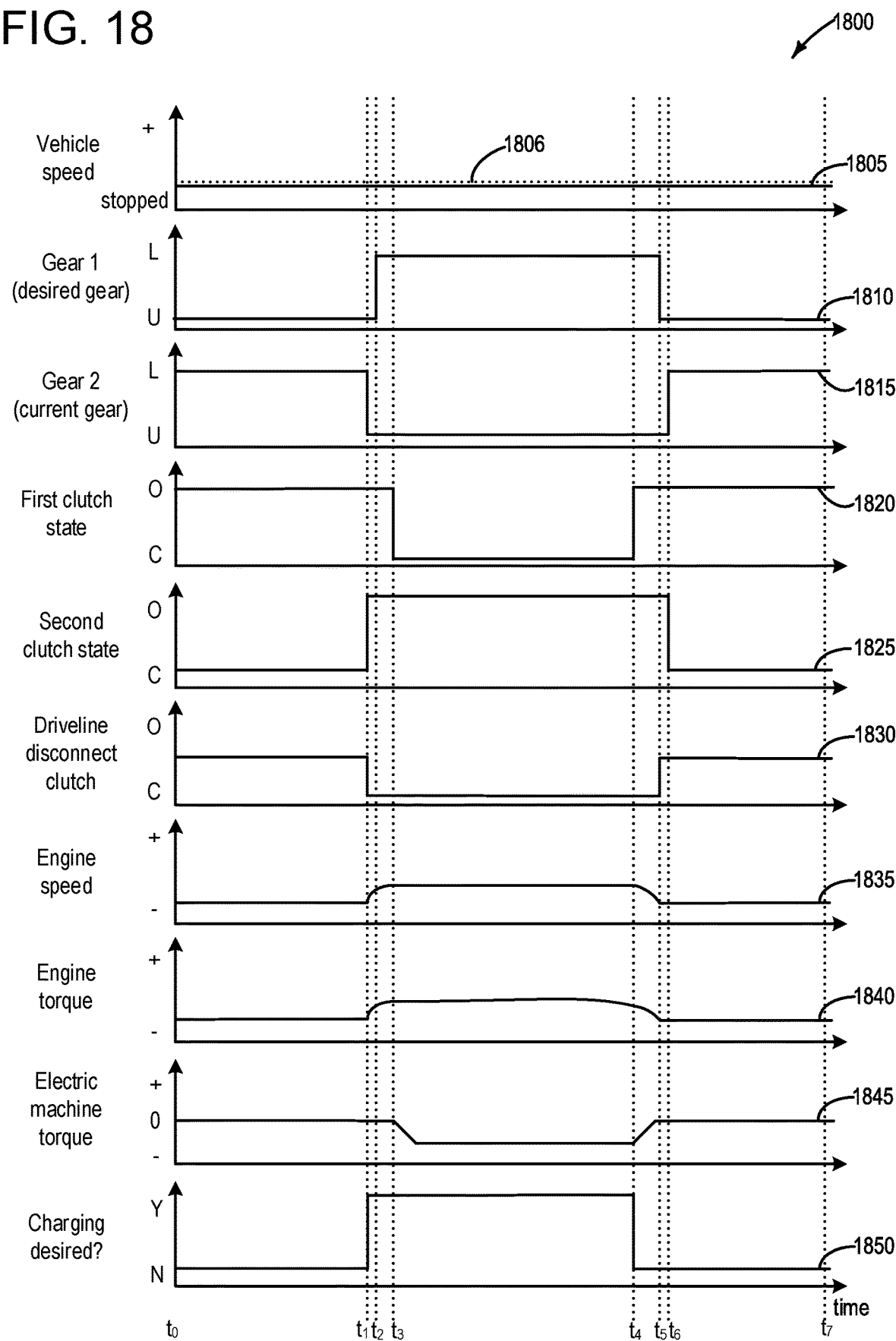
FIG. 18 shows an example timeline for charging the onboard energy storage device when the vehicle is not fully stopped, and where torque modulation via the driveline disconnect clutch is not requested.
Figure 19:
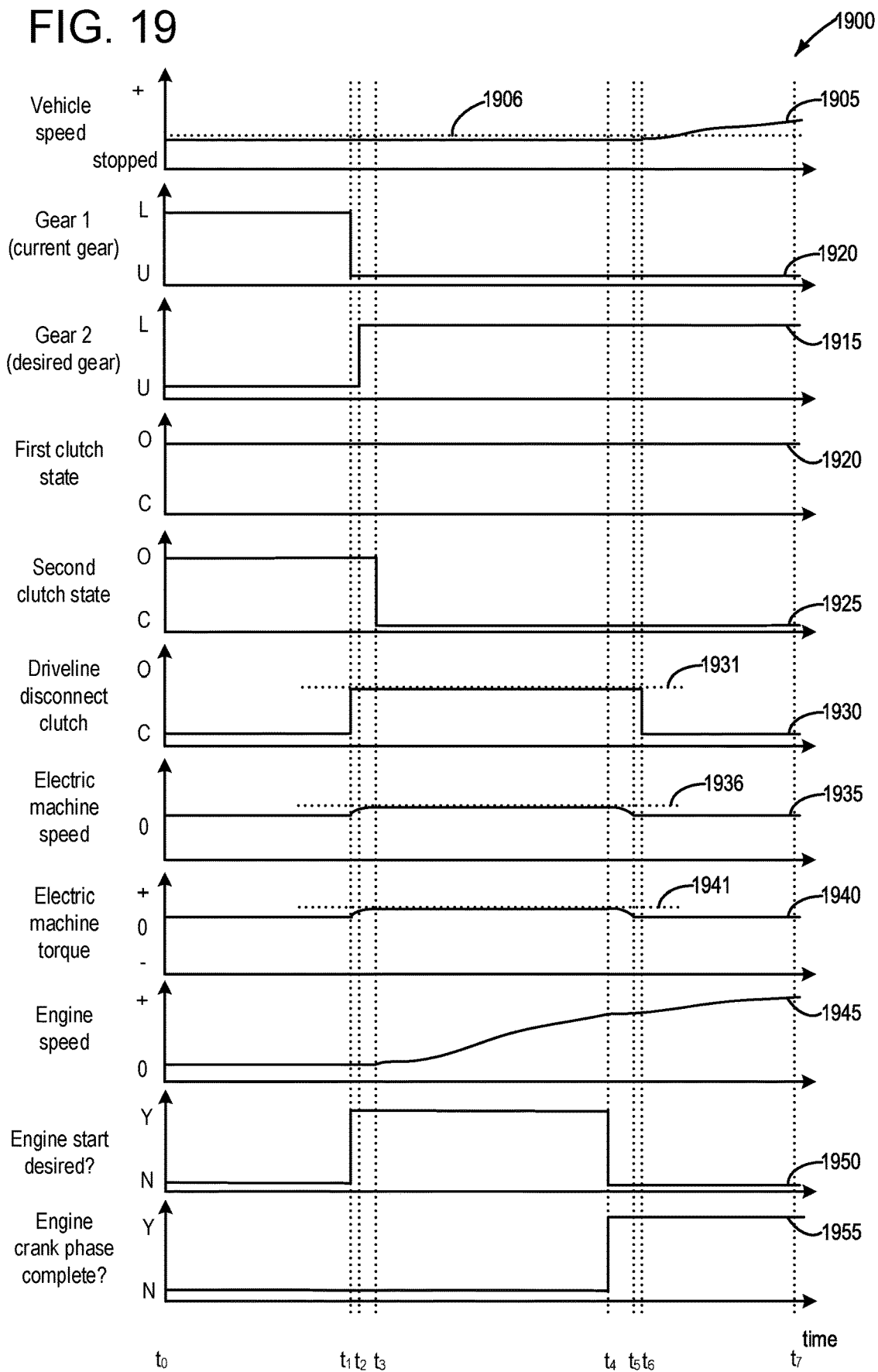
FIG. 19 shows an example timeline for conducting an engine start procedure when vehicle speeds are below a predetermined threshold.
Figure 20:
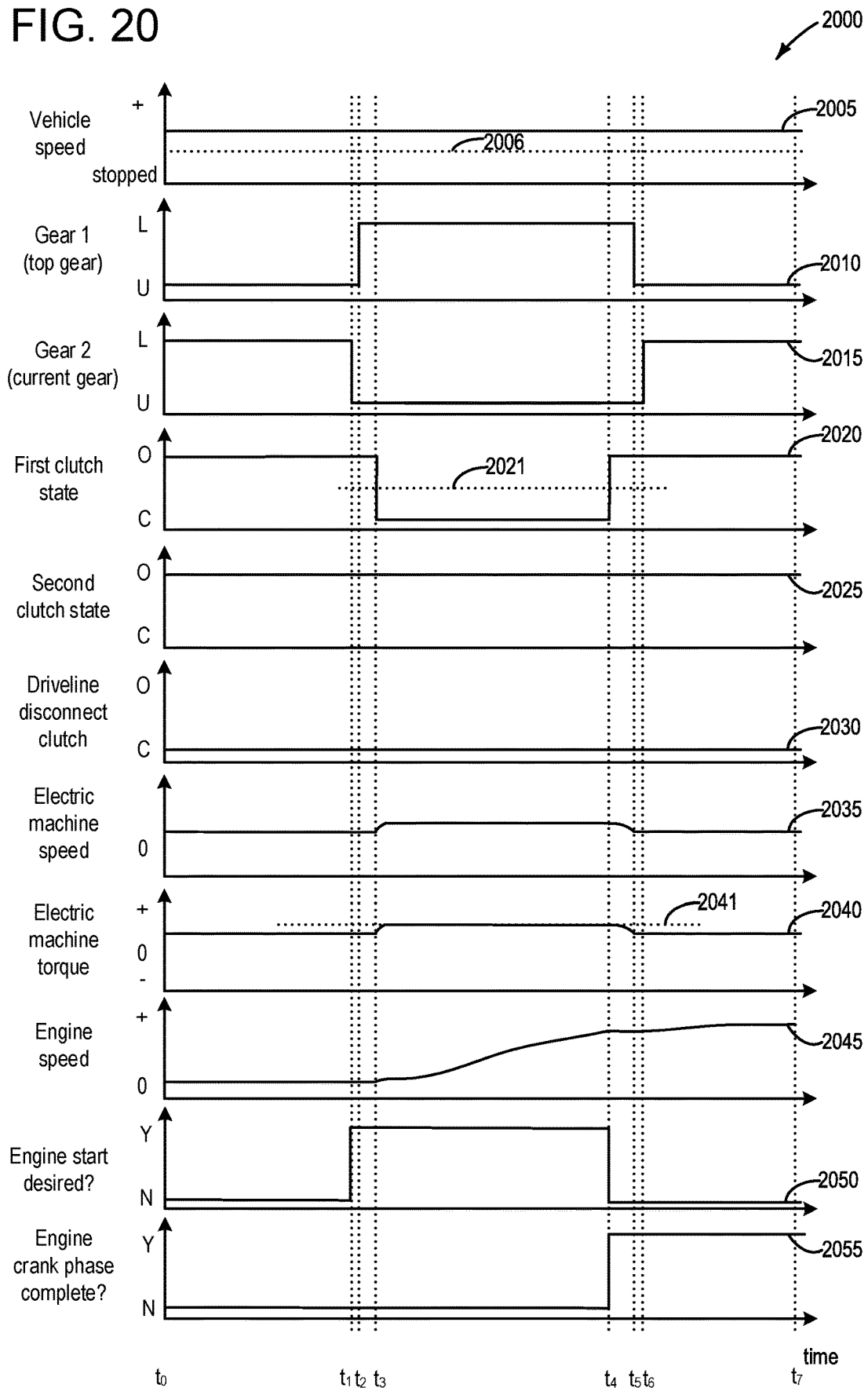
FIG. 20 shows an example timeline for conducting an engine start procedure when vehicle speeds are above a predetermined threshold.

FIG. 16 illustrates an example timeline for charging the onboard energy storage device when the vehicle is stationary. An example timeline for charging the onboard energy storage device when the vehicle is not fully stopped and where torque modulation via a driveline disconnect clutch is requested, is depicted at FIG. 17. FIG. 18 shows an example timeline for charging the onboard energy storage device when the vehicle is not fully stopped, and where torque modulation via the driveline disconnect clutch is not requested. An example timeline for conducting an engine start procedure when vehicle speeds are below a predetermined threshold, is depicted at FIG. 19. FIG. 20 shows an example timeline for conducting an engine start procedure when vehicle speeds are above a predetermined threshold. An example timeline for conducting an engine start procedure during a lift-pedal event where an onboard energy storage device is not capable of accepting further charge, is depicted at FIG. 21.

Figure 1A:
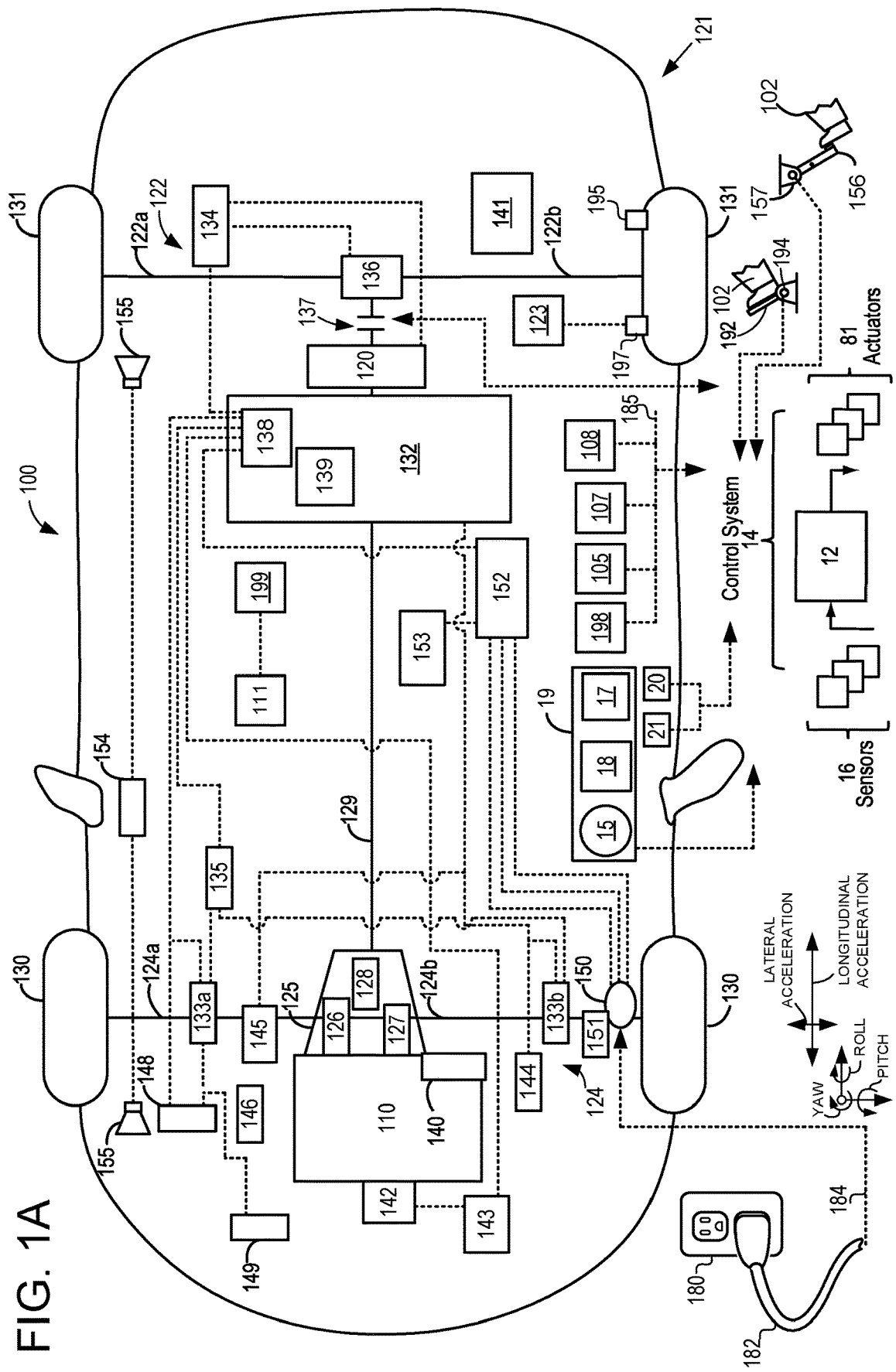
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle 124 and a rear axle 122. In some examples, rear axle may comprise two half shafts, for example first half shaft 122*a*, and second half shaft 122*b*. Furthermore, in some examples, front axle 124 may comprise two half shafts, for example third half shaft 124*a* and fourth half shaft 124*b*. Vehicle propulsion system 100 further has front wheels 130 and rear wheels 131. The rear axle 122 is coupled to electric machine 120 and transmission 125, via which the rear axle 122 may be driven. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131. Alternatively, front axle 124 may be driven electrically via one or more of first electric motor(s) 133*a* and second electric motor 133*b*.

In some examples, a driveline disconnect clutch 137 may be positioned in the driveline between the electric machine 120 and the drive wheels 131, however in other examples, a driveline disconnect clutch may not be included in vehicle 121. Driveline disconnect clutch 137 may be electrically or hydraulically activated. As will be discussed below, in some examples, vehicle operating events such as charging and engine starting may be improved via controlling the driveline disconnect clutch 137.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 3, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120, integrated starter/generator 142, first electric motor 133a, and/or second electric motor 133b. A first inverter system controller (ISC1) 134 may convert alternating current generated by electric machine 120 to direct current for storage at the energy storage device 132 and vice versa.

Similarly, first electric motor 133a and second electric motor 133b may receive electrical power from onboard energy storage device 132. Furthermore, first electric motor 133a and second electric motor 133b may provide a generator function to convert the vehicle's kinetic energy into electrical energy, where the electrical energy may be stored at energy storage device 132 for later use by the electric machine 120, integrated starter generator 142, first electric motor 133a, and/or second electric motor 133b. A third inverter system controller (ISC3) 135 may convert alternating current generated by electric motor(s) 133a and 133b to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 132 may include one or more batteries and/or capacitors.

Control system 14 may communicate with one or more of engine 110, electric machine 120, first electric motor 133a, second electric motor 133b, energy storage device 132, integrated starter/generator 142, transmission 125, etc. Control system 14 may receive sensory feedback information from one or more of engine 110, electric machine 120, first electric motor 133a, second electric motor 133b, energy storage device 132, integrated starter/generator 142, transmission 125, etc. Further, control system 14 may send control signals to one or more of engine 110, electric machine 120, first electric motor 133a, second electric motor 133b, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner ndependently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque. However, while shown in FIG. 1A, BISG 142 may not be included in the vehicle system 100 in some examples. Furthermore, while not explicitly illustrated at FIG. 1A, a crank ISG (CISG) may be positioned in the driveline between the engine and the dual clutch transmission 125. However, as will be discussed in further detail below, in some examples a CISG may not be included. For example, if a vehicle is equipped with a BISG, then a CISG may not be additionally included. Similarly, if a CISG is included in the vehicle, then a BISG may not be additionally included. In an alternative example, both a CISG and a BISG may be included in the same vehicle system. Still further, in some examples, neither a CISG nor a BISG may be included in the vehicle system.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIGS. 1B-3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, first electric motor 133a, second electric motor 133b, and electric machine 120) based on an operator input. Various examples of the operator ignition interface 15 may include interfaces that necessitate a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 10. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
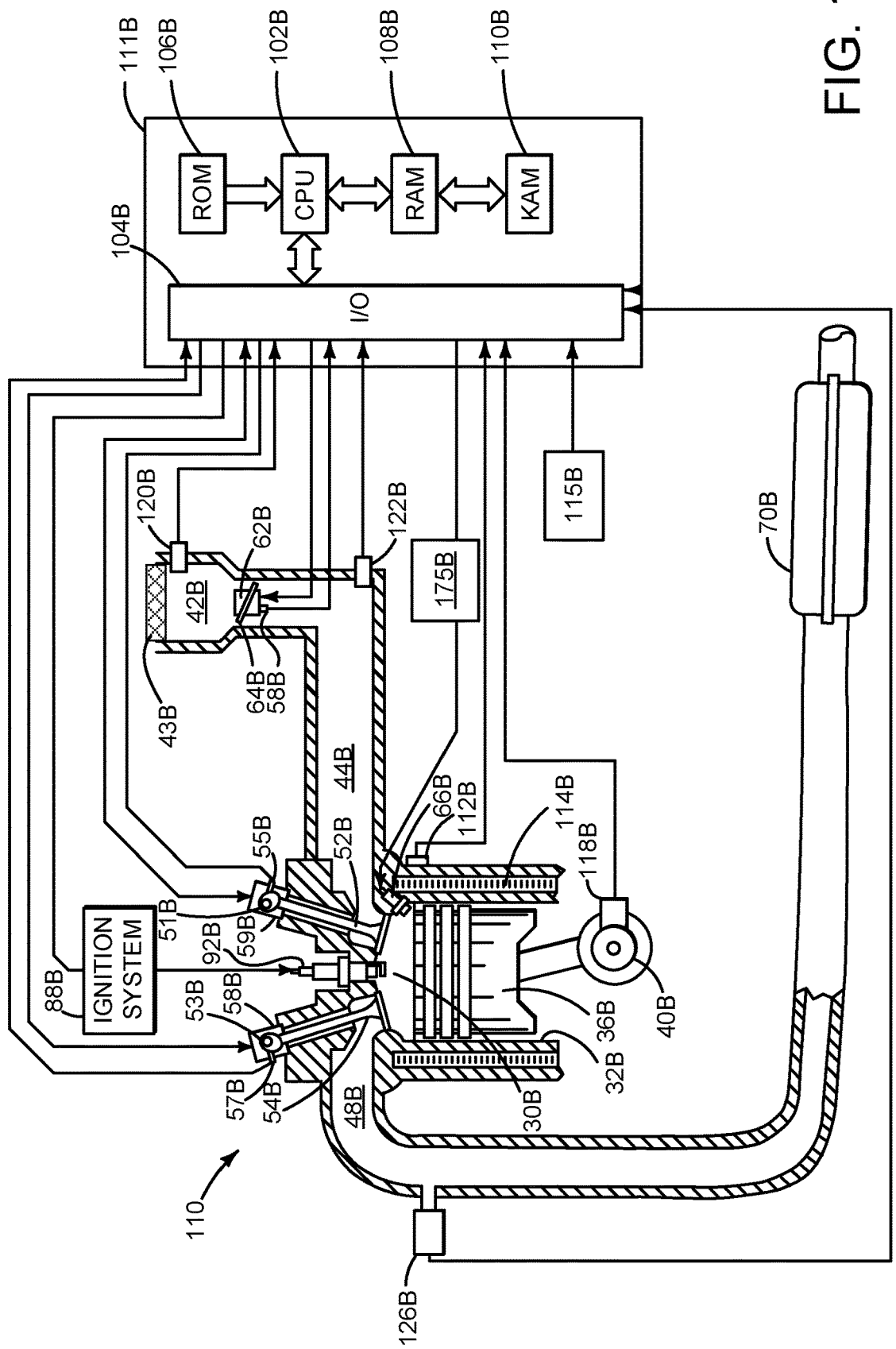
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
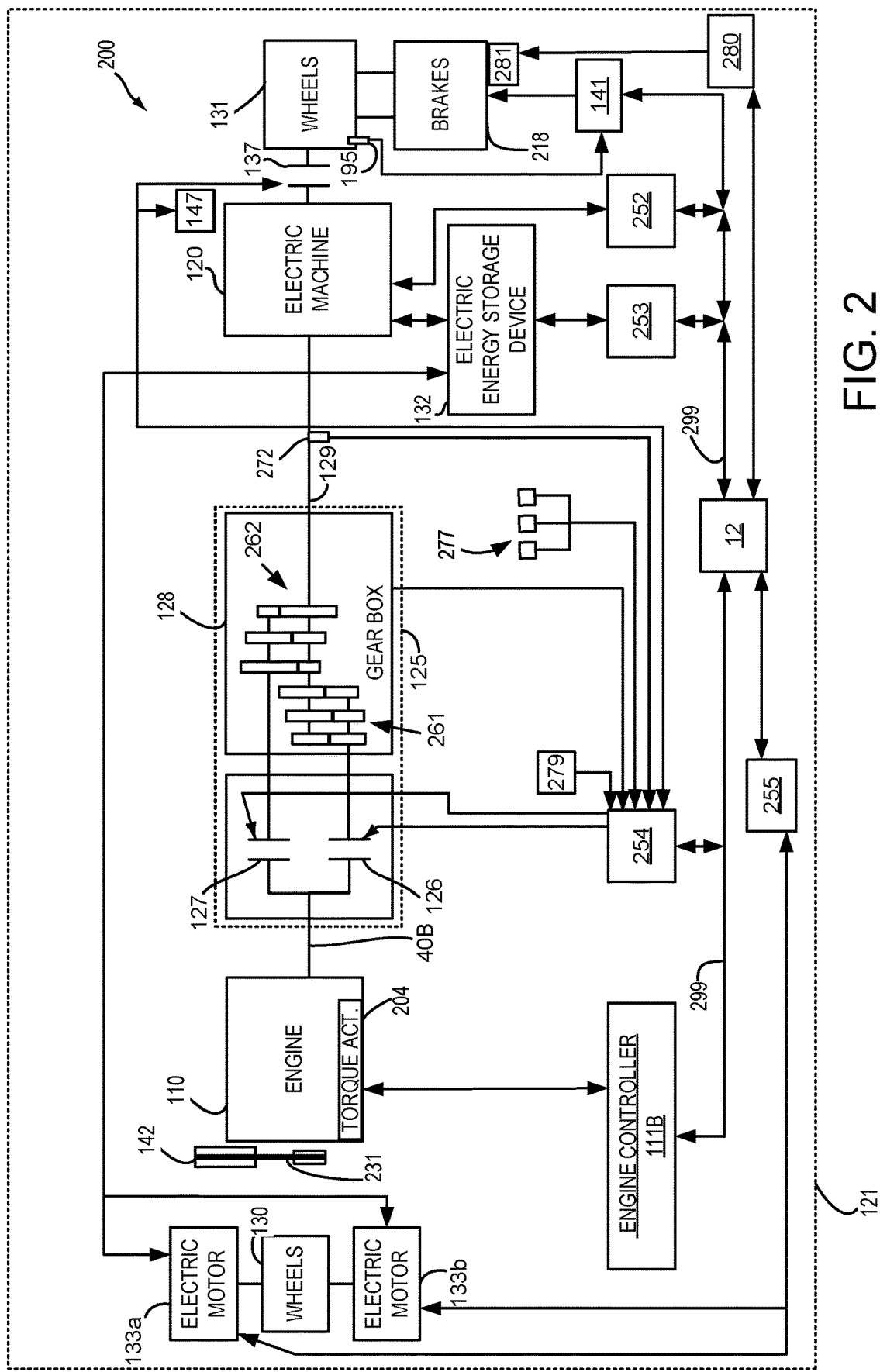
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, electric motor controller 255, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine/electric motors, information regarding degraded brakes). Further, the vehicle system controller 12 may provide commands to engine controller 111B, electric machine controller 252, transmission controller 254, electric motor controller 255, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, electric motor controller 255, and brake controller 141. Alternatively, the vehicle system controller 12 and the engine controller 111B may be a single unit while the electric machine controller 252, electric motor controller 255, the transmission controller 254, and the brake controller 141 may be standalone controllers.

In this example, powertrain 200 may be powered by engine 110 and electric machine 120. In other examples, engine 110 may be omitted. In some examples, wheels 130 may be driven via either or both of first electric motor 133a and/or second electric motor 133b. Engine 110 may be started with an engine starter (e.g. 140), via belt integrated starter/generator (BISG) 142, or via electric machine 120. In some examples, BISG may be coupled directly to the engine crankshaft at either end (e.g., front or back) of the crankshaft. However, as discussed above, in some examples a BISG (e.g. 142) may not be included in the powertrain 200. Electric machine 120 (e.g. high voltage electric machine, operated with greater than 30 volts), is also referred to herein as electric machine, motor, and/or generator. Similarly, first electric motor 133a and second electric motor 133b are also referred to herein as electric machine(s), and/or generator(s). Further, torque of engine 110 may be adjusted via a torque actuator 204, such as a fuel injector, throttle, etc.

Where included, BISG 142 is mechanically coupled to engine 110 via belt 231. BISG 142 may be coupled to a crankshaft 40B or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

In some examples, a driveline disconnect clutch 137 may be positioned between the electric machine and drive wheels 131, as discussed above. Driveline disconnect clutch 137 may be hydraulically or electrically actuated. Driveline disconnect clutch 137 may be actuated via a driveline disconnect clutch actuator 147.

Similarly, first electric motor 133a and second electric motor 133b may be operated to provide torque to wheels 130, or to convert kinetic energy into electrical energy to be stored in electrical energy storage device 132. First electric motor 133a and second electric motor 133b are in electrical communication with energy storage device 132.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252. Furthermore, first electric motor 133a and second electric motor 133b may provide positive or negative torque to wheels 130 via operating as a motor or generator as instructed by electric motor controller 255.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, first electric motor 133a, second electric motor 133b, and brakes 218 provided via engine controller 111B, electric machine controller 252, electric motor controller 255, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art. Similarly, electric motor controller 255 may control torque output and electrical energy production from first electric motor 133a and second electric motor 133b by adjusting current flowing to and from field and/or armature windings of first and second electric motor (e.g. 133a and 133b) as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, first input shaft speed sensor(s), second input shaft speed sensor(s), and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125. Additionally, as discussed above and which will be discussed in further detail below, in some examples additional torque may be provided to wheels 130 via one or more of first electric motor 133a and second electric motor 133b.

Figure 3:
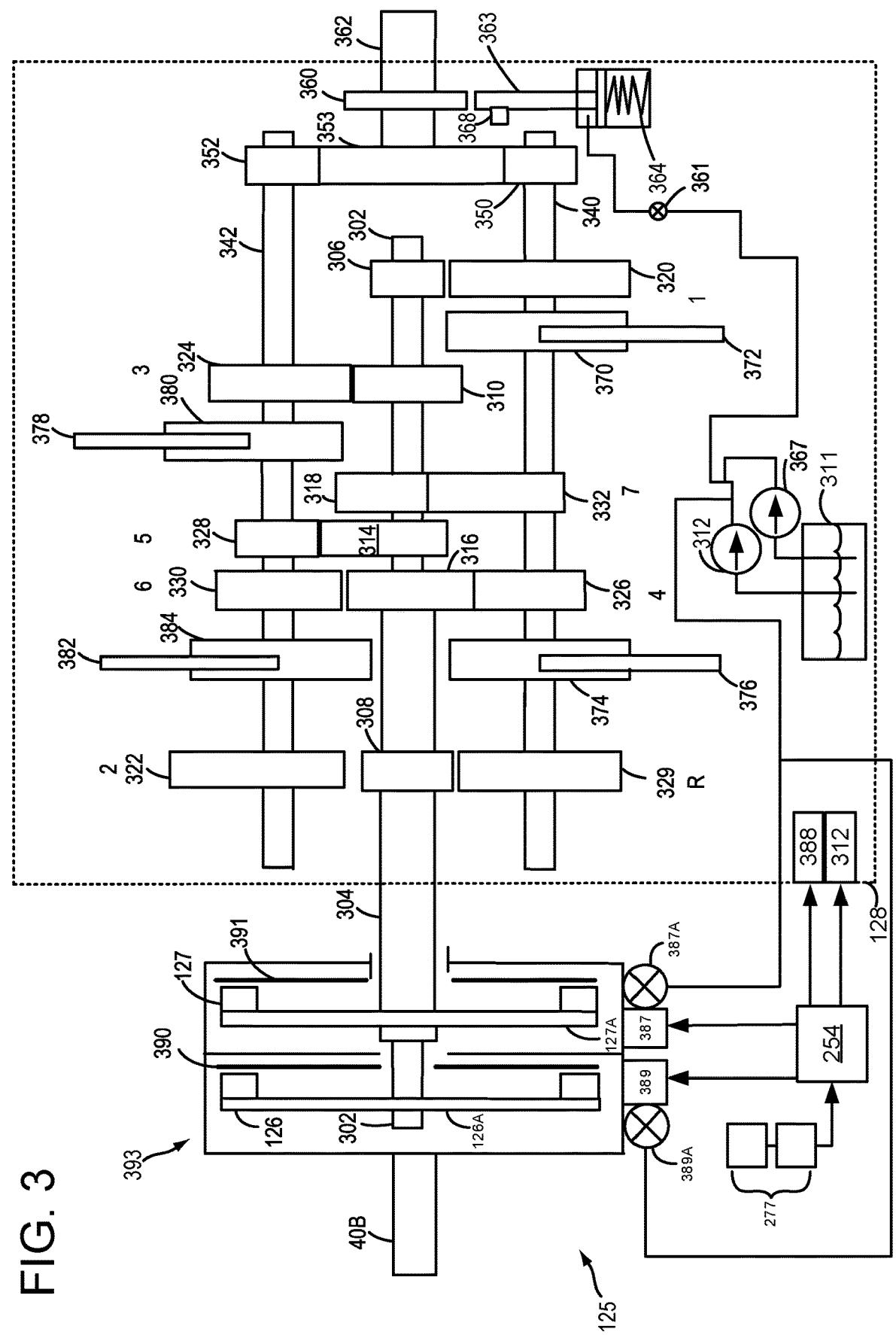
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 328, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 329, and may further include fourth fixed gear 316, for receiving either fourth gear 326 or sixth gear 330. Accordingly, the dual clutch transmission may simultaneously have engaged two different gear ratios (e.g. first gear 320 received via first fixed gear 306, and second gear 322 received by second fixed gear 308).

It may be understood that both first transmission input shaft 302 and second transmission input shaft 304 may be connected to each of first clutch 126 and second clutch 127 via spines (not shown) on the outside of each shaft, respectively. In a normal resting state, each of first clutch 126 and second clutch 127 are held open (e.g. fully open), for example via springs (not shown), etc., such that no torque from engine (e.g. 110) may be transmitted to first transmission input shaft 302 or second transmission input shaft 304 when each of the respective clutches are in a fully open state. Responsive to closing first clutch 126, engine torque may be transmitted to first transmission input shaft 302, and responsive to closing second clutch 127, engine torque may be transmitted to second transmission input shaft 304. In some examples, during normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 328, and reverse gear 329. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 328, sixth gear 330, seventh gear 332, and reverse gear 329 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 384. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either fourth gear 326 or reverse gear 329. Fourth synchronizer 384 may be utilized to lock either second gear 322, or sixth gear 330. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. In some examples, first clutch actuator 389 may control a first clutch valve 389A, and second clutch actuator 387 may control a second clutch valve 387A. For example, both first clutch valve 389A and second clutch valve 387A may comprise pressure control valves. Both first clutch valve 389A and second clutch valve 387A may control fluid flow supplied from transmission pump 312, for example, to control opening and closing of first clutch 126 and second clutch 127, respectively. In some examples, TCM 254 may control transmission pump.

TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor, which may be utilized by the TCM to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, in some examples it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second layshaft shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 370, and wherein first clutch 126 is closed (and second clutch 127 is open), power may be transmitted from the engine to first input shaft 302, and to first layshaft 340. While first gear 320 is engaged, second gear 322 may simultaneously be locked via fourth synchronizer 384. Because second gear 322 is locked, this may rotate second input shaft 304, where the second input shaft 304 is speed matched to the vehicle speed in second gear. In an alternative case where a gear is pre-selected on the other layshaft (e.g. second layshaft 442), that layshaft will also rotate as it is driven by output shaft 362 and pinion 352.

When a gear shift is initiated by TCM 254, only the clutches may be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 125 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, discussed herein, a dual clutch transmission (DCT) may comprise a transmission that uses two separate clutches for odd and even gear sets. One clutch (e.g. 126) is utilized to transfer engine torque to one input shaft (e.g. 302), while a separate clutch (e.g. 127) is utilized to transfer engine torque to a separate input shaft (e.g. 304). The dual clutch transmission receives engine torque via an engine crankshaft (e.g. 40B), and outputs torque via an output shaft (e.g. 362).

For a hybrid vehicle system as depicted above, with a dual clutch transmission downstream of an engine, and where an electric machine is positioned downstream of the dual clutch transmission, starting the engine under various vehicle operating conditions, as well as charging an onboard energy storage device under various vehicle operating conditions, may be conducted by controlling a capacity of a driveline disconnect clutch positioned downstream of the electric machine, as will be discussed in further detail below.

Turning to FIG. 4, a high level example method 400 for charging an onboard energy storage device, or for starting an engine, depending on various vehicle operating parameters, is shown. More specifically, a vehicle configured with an engine (e.g. 110), a dual clutch transmission (e.g. 125) downstream of the engine, an electric machine (e.g. 120) downstream of the dual clutch transmission, and a driveline disconnect clutch (e.g. 137) downstream of the electric machine, may provide engine starting and onboard energy storage device charging opportunities without a BISG (e.g. 142) or a CISG (not shown). By eliminating the BISG or CISG from the powertrain, and including a driveline disconnect clutch (e.g. 137), engine starting events and onboard energy storage device charging events may be accomplished with reduced costs, and without introducing unacceptable noise, vibration, and harshness (NVH).

Method 400 will be described with reference to the systems described herein and shown in FIGS. 1A-3, though it should be understood that similar methods may be applied to other systems without departing from the scope of this disclosure. Method 400 may be carried out by a controller, such as controller 12 in FIG. 1, and may be stored at the controller as executable instructions in non-transitory memory. Instructions for carrying out method 400 and the rest of the methods included herein may be executed by the controller based on instruction stored on a memory of the controller and in conjunction with signals received from sensors of the engine system, such as the sensors described above with reference to FIGS. 1A-3. The controller may employ engine system actuators such as electric machine (e.g. 120), selector forks (e.g. 372, 376, 378, 382), first clutch (e.g. 126), second clutch (e.g. 127), fuel injectors (e.g. 66B), first clutch actuator (e.g. 389), second clutch actuator (e.g. 387), driveline disconnect clutch actuator (e.g. 147), etc., according to the method depicted below.

Method 400 begins at 403, and includes indicating whether vehicle speed is below a synchronous engine idle speed for first gear. Such an indication may be determined via wheel speed sensor(s) (e.g. 195) for determining vehicle speed, and via engine speed sensor(s) (e.g. 277). If, at 403, it is indicated that vehicle speed is below synchronous engine idle speed for first gear (e.g. 320), method 400 may proceed to 406. At 406, method 400 may determine whether the engine is running. For example, the engine may be indicated to be running if fuel and spark are being provided to the engine such that the engine is combusting fuel. If, at 406, it is indicated that the engine is not running, method 400 may proceed to 439. At 439, method 400 may include indicating whether an engine start is desired. For example, an engine start may be desired responsive to a request for vehicle acceleration, a vehicle-operator requested usage of energy-consuming vehicle components, such as components related to vehicle cabin heating and cooling, radio, audio and video components, etc. If, at 439, it is indicated that an engine start is not desired, method 400 may end. Alternatively, at 439, responsive to an indication that an engine start is desired, method 400 may proceed to 442. At 442, method 400 may include starting the engine according to method 800 depicted at FIG. 8. Method 400 may then end.

Returning to 406, it is indicated that the engine is running, method 400 may proceed to 409. At 409, method 400 may include determining whether the engine is desired to be maintained running, or maintain operation. For example, there may be energy usage conditions of the vehicle which may demand use of the engine. Examples may include heating and air conditioning systems, radio, onboard navigation systems, lights, vehicle audio and video systems, etc.

Thus, at 409, if it is indicated that the engine is not still desired to be running, or maintained in operation, method 400 may proceed to 412. At 412, method 400 may include stopping the engine according to the method depicted at FIG. 9. Method 400 may then end.

Returning to 409, responsive to a condition where the engine is still desired to run, method 400 may proceed to 415. At 415, method 400 may include indicating whether high voltage charging of an onboard energy storage device (e.g. 132) is desired. In some examples, determining at 415 whether high voltage charging of the onboard energy storage device is desired may include indicating a current level of energy storage via the energy storage device, and if the energy storage is below a threshold, high voltage charging may be desired. In other examples, high voltage charging may additionally or alternatively be desired responsive to an indication of fuel level, temperature of the electric machine (e.g. 120), etc. If, at 415, it is indicated that high voltage charging of the onboard energy storage device is not desired, method 400 may proceed to 418. At 418, method 400 may include maintaining current vehicle operating conditions. For example, engine operating may continue without charging of the onboard energy storage device. In other examples, if the vehicle is being additionally propelled via the electric machine (e.g. 120), or in some examples, electric motor(s) (e.g. 133a, 133b), then the vehicle may be maintained being propelled at least in part via the electric machine (e.g. 120), or electric motor(s) (e.g. 133a, 133b). Method 400 may then end.

Returning to 415, if it is indicated that high voltage charging of the onboard energy storage device is desired, method 400 may proceed to 421. At 421, method 400 may include indicating whether the vehicle is fully stopped. Such an indication may be provided via one or more wheel speed sensor(s) (e.g. 195), as an example. In such an example, it may be understood that "fully stopped" may refer to a vehicle that is not moving at all in a forward, or reverse motion. If, at 421, it is indicated that the vehicle is fully stopped, then method 400 may proceed to 424. At 424, method 400 may include charging of the onboard energy storage device according to method 500 depicted below at FIG. 5. Method 400 may then end.

Returning to 421, if it is indicated that the vehicle is not fully stopped, method 400 may proceed to 427, and may include indicating whether torque modulation via the driveline disconnect clutch is desired, or requested. If, at 427, it is indicated that torque modulation via the driveline disconnect clutch is desired, method 400 may proceed to 430, and may include charging the onboard energy storage device according to method 600 depicted at FIG. 6. Method 400 may then end.

Returning to 427, responsive to an indication that torque modulation via the driveline clutch is not desired, or requested, method 400 may proceed to 433. At 433, method 400 may include indicating whether a brake pedal (e.g. 156) is sufficiently applied. More specifically, it may be indicated whether the brake pedal is pressed a calibratable, or threshold, amount. Such an indication may be communicated to the vehicle controller, for example, where such an indication may be determined via sensory feedback from a pedal position sensor (e.g. 157) that communicates with the brake pedal. If, at 433, it is indicated that the brake pedal is sufficiently depressed, or in other words, if it is indicated that the brake pedal is depressed to at least the threshold amount, method 400 may proceed to 424. At 424, method 400 may include charging the onboard energy storage device according to method 500 depicted at FIG. 5. Method 400 may then end.

Alternatively, responsive to the brake pedal not being sufficiently depressed at 433, method 400 may proceed to 436. At 436, method 400 may include charging the onboard energy storage device according to method 700 depicted at FIG. 7. Method 400 may then end.

Returning to 403, responsive to vehicle speed being indicated to be above synchronous engine idle speed for first gear, method 400 may proceed to 445. At 445, method 400 may include indicating whether the engine is running. As discussed above, the engine may be indicated to be running if fuel and spark are being provided to the engine such that the engine is combusting fuel. Responsive to an indication that the engine is running at 445, method 400 may proceed to 448, and may include indicating whether the engine is still desired to be maintained running, or maintained in operation. As discussed above, energy usage conditions of the vehicle may in some examples demand the engine be operated. Such examples may include heating and air conditioning systems, radio, onboard navigation systems, lights, vehicle audio and video systems, etc. In another example, the engine may be desired to be maintained running in response to driver demanded wheel torque.

If, at 448, it is indicated that the engine is not still desired to be maintained in operation, method 400 may proceed to 451, and may include stopping the engine according to method 900 depicted at FIG. 9. Method 400 may then end. Alternatively, responsive to an indication that the engine is still desired to run at 448, method 400 may proceed to 454, and may include indicating whether high voltage charging of the onboard energy storage device (e.g. 132) is desired. As discussed above, in some examples, determining at 454 whether high voltage charging of the onboard energy storage device is desired may include indicating a current level of energy storage of the energy storage device. If energy storage is below a threshold, high voltage charging may be desired, in some examples. Additionally or alternatively, high voltage charging may be desired responsive to an indication of fuel level, temperature of the electric machine (e.g. 120), etc. If, at 454, it is indicated that high voltage charging of the onboard energy storage device is not desired, method 400 may proceed to 457. At 457, method 400 may include maintaining current vehicle operating conditions. For example, engine operation may continue without charging of the onboard energy storage device. In other examples, if the vehicle is being additionally propelled via the electric machine (e.g. 120), or in some examples, electric motor(s) (e.g. 133*a*, 133*b*), then the vehicle may be maintained being propelled at least in part via the electric machine (e.g. 120), or electric motor(s) (e.g. 133*a*, 133*b*). Method 400 may then end.

Returning to 454, responsive to an indication that high voltage charging is desired, method 400 may proceed to 460. At 460, method 400 may include charging the onboard energy storage device according to FIG. 11. Method 400 may then end.

Returning to 445, responsive to an indication that vehicle speed is above synchronous engine idle speed for first gear, and further responsive to an indication that the engine is not running, method 400 may proceed to 463. At 463, method 400 may include indicating whether an engine start is desired. As discussed above, an engine start may be desired responsive to a request for vehicle acceleration, a vehicle-operator requested usage of energy-consuming vehicle components, etc. If, at 463, it is indicated that an engine start is not desired, method 400 may end. Alternatively, at 463, responsive to an indication that an engine start is desired, method 400 may proceed to 466. At 466, method 400 may include starting the engine according to method 1000 depicted at FIG. 10. Method 400 may then end.

Turning now to FIG. 5, a high level example method 500 for charging an onboard energy storage device, is shown. More specifically, method 500 may comprise a sub-method of method 400 depicted at FIG. 4. Method 500 may be utilized responsive to an indication that a vehicle speed is below a synchronous engine idle speed for first gear, where the engine is running and where high voltage charging of an onboard energy storage device (e.g. 132) is desired. In one example, method 500 may be carried out further responsive to an indication that the vehicle is fully stopped. In another example, method 500 may be carried out responsive to the vehicle not being fully stopped, where torque modulation via the driveline disconnect clutch is not desired, and where it is indicated that the brake pedal is sufficiently applied (e.g. depressed at least a threshold amount), discussed above at FIG. 4.

Method 500 will be described with reference to the systems described herein and shown in FIGS. 1A-3, though it should be understood that similar methods may be applied to other systems without departing from the scope of this disclosure. Method 500 may be carried out by a controller, such as controller 12 in FIG. 1, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), engine torque actuator(s) (e.g. 204), selector forks (e.g. 372, 376, 378, 382), first clutch actuator (e.g. 389), second clutch actuator (e.g. 387), driveline disconnect clutch actuator (e.g. 147), etc., according to the method depicted below.

Method 500 begins at 505 and may include fully opening the driveline disconnect clutch (e.g. 137). In other words, a pressure applied to the driveline disconnect clutch for controlling opening and closing of the driveline disconnect clutch (e.g. a hydraulically actuated driveline disconnect clutch), may be controlled such that the driveline disconnect clutch is fully open. For example, no pressure may be supplied to the driveline disconnect clutch at 505, thus resulting in the driveline disconnect clutch being fully opened. As discussed herein, it may be understood that when the driveline disconnect clutch is fully open, no torque from upstream of the driveline disconnect clutch may be transferred to drive wheels (e.g. 131).

Proceeding to 510, method 500 include determining a desired transmission gear. In some examples, the desired gear may comprise a gear already selected via an appropriate synchronizer. However, in some examples, the desired transmission gear may not comprise a gear already selected via an appropriate synchronizer. The desired gear may comprise a gear that enables the most energy efficient charging of the onboard energy storage device (e.g. 132), for example. In some examples, the desired gear may be a function of engine speed, engine load, temperature of the electric machine (e.g. 120), level of onboard energy storage at the onboard energy storage device, etc. In another example, the desired gear may comprise a gear selected to prevent the electric machine (e.g. 120) from being clipped by its torque limit.

Proceeding to 515, method 500 may include locking the dual clutch transmission (e.g. 125) in the desired gear determined at 510. More specifically, the desired gear may be engaged via an appropriate synchronizer engaging the desired gear. By engaging an appropriate synchronizer with the desired gear, it may be understood that torque may be transferred between an input shaft of the dual clutch transmission and a layshaft of the dual clutch transmission. For example, if the desired gear is sixth gear (e.g. 330), then a synchronizer (e.g. 384) may engage the sixth gear such that torque may be transferred between the second input shaft (e.g. 304) and the second layshaft (e.g. 342).

Proceeding to 520, method 500 may include locking the DCT clutch corresponding to the desired transmission gear shaft. Relying on the example above at step 515, if sixth gear (e.g. 330) were engaged at 515 via the appropriate synchronizer (e.g. 384), then locking the DCT clutch at 520 may include locking the second clutch (e.g. 127). At 520, locking the DCT clutch may include controlling a pressure supplied to the clutch such that the clutch does not experience slip during engine operation to charge the onboard energy storage device, as will be discussed below.

Responsive to the appropriate DCT clutch being locked at 520, method 500 may proceed to 525. At 525, method 500 may include producing a charging torque with the engine. There may be two options for producing charging torque with the engine at 525. In one example, the engine may be controlled in speed control mode, with an arbitrary speed target, where the arbitrary speed target may include idle speed, or an elevated idle speed. In such an example, the electric machine (e.g. 120) may be controlled in a torque control mode.

Discussed herein, it may be understood that when operating the engine in engine speed control mode, engine torque may be varied to achieve a desired engine speed. Alternatively, when operating in engine torque control mode, engine speed may be varied to achieve a desired engine torque. Similarly, it may be understood that when operating the electric machine in speed control mode, electric machine torque may be varied to achieve a desired electric machine speed. Alternatively, when operating the electric machine in torque control mode, electric machine speed may be varied to achieve a desired electric machine torque.

In a second example, the engine may be operated in a torque control mode, and the electric machine may be operated in speed control mode, with a speed control target corresponding to a desired engine speed.

Proceeding to 530, method 500 may include absorbing engine torque with the electric machine. In such an example, it may be understood that the electric machine may be functioning as a generator to increase a level of onboard energy storage at an onboard energy storage device (e.g. 132). More specifically, at 530, absorbing engine torque with the electric machine may include converting alternating current generated via the electric machine to direct current for storage at the energy storage device. A first inverter system controller (ISC1) (e.g. 134) may be utilized to convert alternating current from the electric machine to direct current, for example.

Charging of the onboard energy storage device may proceed until a desired level of onboard energy storage has been achieved, in one example. In another example, charging of the onboard energy storage device may proceed until either the desired level of onboard energy storage has been achieved, or until vehicle operating conditions change such that charging of the onboard energy storage device may not continue. In some examples, charging of the onboard energy storage device may be a function of fuel in the fuel tank. For example, if fuel is below a threshold, then charging may be discontinued, in some examples.

Responsive to charging the onboard energy storage device via absorbing engine torque with the electric machine, and converting alternating current to direct current for storage, method 500 may end.

Turning now to FIG. 6, a high level example method 600 for charging an onboard energy storage device, is shown. More specifically, method 600 may comprise a sub-method of method 400 depicted at FIG. 4. Method 600 may be utilized responsive to an indication that a vehicle speed is below a synchronous engine idle speed for first gear, where the engine is running and where high voltage charging of an onboard energy storage device (e.g. 132) is desired. In one example method 600 may be carried out further responsive to an indication that the vehicle is not fully stopped, and that torque modulation via the driveline disconnect clutch is desired, or requested.

Method 600 will be described with reference to the systems described herein and shown in FIGS. 1A-3, though it should be understood that similar methods may be applied to other systems without departing from the scope of this disclosure. Method 600 may be carried out by a controller, such as controller 12 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), engine torque actuator(s) (e.g. 204), selector forks (e.g. 372, 376, 378, 382), first clutch actuator (e.g. 389), second clutch actuator (e.g. 387), driveline disconnect clutch actuator (e.g. 147), etc., according to the method depicted below.

Method 600 begins at 605, and may include controlling the driveline disconnect clutch such that the driveline disconnect clutch undergoes slip during charging of the onboard energy storage device as depicted via method 600. More specifically, at 605, method 600 may include controlling capacity of the driveline disconnect clutch equal to driver demand. As discussed above, controlling capacity of the driveline disconnect clutch may include controlling a pressure applied to the driveline disconnect clutch, to increase capacity of the driveline disconnect clutch such that driveline disconnect clutch capacity is substantially equivalent to driver demand. In other examples, the driveline disconnect clutch may be electrically actuated to a capacity substantially equivalent to driver demand, for example.

With driveline disconnect capacity controlled to be substantially equivalent to driver demand, method 600 may proceed to 610. At 610, method 600 may include determining desired transmission gear. As discussed above, in some examples the desired gear may comprise a gear already selected via an appropriate synchronizer. In other examples, the desired transmission gear may not comprise a gear already selected via an appropriate synchronizer. The desired gear may comprise a gear that enables energy efficient charging of the onboard energy storage device (e.g. 132). The desired gear may be a function of engine speed, engine load, temperature of the electric machine (e.g. 120), level of onboard energy storage at the onboard energy storage device, etc. In another example, the desired gear may comprise a gear selected to prevent the electric machine (e.g. 120) from being clipped by its torque limit.

Proceeding to 615, method 600 may include locking the dual clutch transmission (e.g. 125) in the desired gear determined at 610. More specifically, as discussed above, the desired gear may be engaged via an appropriate synchronizer engaging the desired gear. By engaging an appropriate synchronizer with the desired gear, it may be understood that torque may be transferred between an input shaft of the dual clutch transmission and a layshaft of the dual clutch transmission.

Proceeding to 620, method 600 may include locking the DCT clutch corresponding to the desired transmission gear shaft. For example, if the desired gear was seventh gear (e.g. 332), then locking the DCT clutch at 620 may include locking the first clutch (e.g. 126). At 620, locking the DCT clutch may include controlling a pressure supplied to the clutch such that the DCT clutch does not experience slip during engine operation to charge the onboard energy storage device.

Responsive to the appropriate DCT clutch being locked at 620, method 600 may proceed to 625. At 625, method 600 may include producing a charging torque with the engine. As discussed above, it may be understood herein that when operating the engine in engine speed control mode, engine torque may be varied to achieve a desired engine speed. Alternatively, when operating in engine torque control mode, engine speed may be varied to achieve a desired engine torque. Similarly, it may be understood that when operating the electric machine in speed control mode, electric machine torque may be varied to achieve a desired electric machine speed. Alternatively, when operating the electric machine in torque control mode, electric machine speed may be varied to achieve a desired electric machine torque.

Thus, at 625, there may be two options for producing charging torque with the engine. In one example, the engine may be controlled in speed control mode, with an arbitrary speed target, where the arbitrary speed target may include idle speed, or an elevated idle speed. In such an example, the electric machine (e.g. 120) may be controlled in a torque control mode. In another example, the engine may be operated in a torque control mode, and the electric machine may be operated in speed control mode, with a speed control target corresponding to a desired engine speed.

Proceeding to 630, method 600 may include absorbing engine torque with the electric machine. In such an example, it may be understood that the electric machine is functioning as a generator to increase a level of onboard energy storage at an onboard energy storage device (e.g. 132). More specifically, at 630, absorbing engine torque with the electric machine may include converting alternating current generated via the electric machine to direct current for storage at the energy storage device. A first inverter system controller (ISC1) (e.g. 134) may be utilized to convert alternating current from the electric machine to direct current, for example.

As discussed above, charging of the onboard energy storage device may proceed until a desired level of onboard energy storage has been achieved, in one example. In another example, charging of the onboard energy storage device may proceed until either the desired level of onboard energy storage has been achieved, or until vehicle operating conditions change such that charging of the onboard energy storage device may not continue. In some examples, charging of the onboard energy storage device may be a function of fuel in the fuel tank. For example, if fuel is below a threshold, then charging may be discontinued, in some examples.

Responsive to charging the onboard energy storage device via absorbing engine torque with the electric machine, and converting alternating current to direct current for storage, method 600 may end.

Turning now to FIG. 7, a high level example method 700 for charging an onboard energy storage device, is shown. More specifically, method 700 may comprise a sub-method of method 400 depicted at FIG. 4. Method 700 may be utilized responsive to an indication that vehicle speed is below a synchronous engine idle speed for first gear, where the engine is running and where high voltage charging of an onboard energy storage device (e.g. 132) is desired. In one example, method 700 may be carried out further responsive to an indication that the vehicle is not fully stopped, that torque modulation via the driveline disconnect clutch (e.g. 137) is not desired, and that the brake pedal is not sufficiently applied. As an example, the brake pedal being not sufficiently applied may comprise the brake pedal not being depressed to a threshold amount.

Method 700 will be described with reference to the systems described herein and shown in FIGS. 1A-3, though it should be understood that similar methods may be applied to other systems without departing from the scope of this disclosure. Method 700 may be carried out by a controller, such as controller 12 in FIG. 1, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), engine torque actuator(s) (e.g. 204), selector forks (e.g. 372, 376, 378, 382), first clutch actuator (e.g. 389), second clutch actuator (e.g. 387), driveline disconnect clutch actuator (e.g. 147), etc., according to the method depicted below.

Method 700 begins at 705 and may include engaging the first gear (e.g. 320) of the dual clutch transmission (e.g. 125). For example, an appropriate synchronizer (e.g. 370) may be controlled to engage the first gear (e.g. 320), such that torque may be transferred between a first input shaft (e.g. 302) and a first layshaft (e.g. 340) of the dual clutch transmission.

Proceeding to 710, method 700 may include locking the appropriate DCT clutch corresponding to first gear. More specifically, with first gear locked via its appropriate synchronizer, at 710, method 700 may include commanding capacity increased to the first clutch (e.g. 126), such that torque may be transferred between the engine and the transmission. Furthermore, locking the DCT clutch at 710 may include controlling capacity to a level where the clutch is not expected to undergo slippage during the charging procedure of the onboard energy storage device.

With the DCT clutch corresponding to first gear in a locked configuration, method 700 may proceed to 715. At 715, method 700 may include locking the driveline disconnect clutch (e.g. 137). Locking the driveline disconnect clutch at 715 may include applying a pressure to the driveline disconnect clutch such that the driveline disconnect clutch is closed. In some examples, locking the driveline disconnect clutch at 715 may include commanding the driveline disconnect clutch to the maximum capacity enabled for the driveline disconnect clutch. However, in other examples, locking the driveline disconnect clutch at 715 may include supplying an amount of pressure to the driveline disconnect clutch such that the driveline disconnect clutch does not undergo any slippage during the charging of the onboard energy storage device. While the above example depicts a hydraulically actuated driveline disconnect clutch, in other examples, the driveline disconnect clutch may be electrically actuated.

Proceeding to 720, method 700 may include producing a charging torque with the engine. As discussed above, there may be two options for producing charging torque with the engine. In one example, the engine may be controlled in speed control mode, with an arbitrary speed target, where the arbitrary speed target may include idle speed, or an elevated idle speed. In such an example, the electric machine (e.g. 120) may be controlled in a torque control mode. In another example, the engine may be operated in a torque control mode, and the electric machine may be operated in speed control mode, with a speed control target corresponding to a desired engine speed. In still another example, the engine may be controlled in a torque control mode of operation, while the electric machine may additionally be controlled in a torque control mode of operation.

Proceeding to 725, method 700 may include absorbing engine torque with the electric machine. In such an example, it may be understood that the electric machine may be functioning as a generator to increase a level of onboard energy storage at an onboard energy storage device (e.g. 132). More specifically, at 725, absorbing engine torque with the electric machine may include converting alternating current generated via the electric machine to direct current for storage at the energy storage device. A first inverter system controller (ISC1) (e.g. 134) may be utilized to convert alternating current from the electric machine to direct current, for example.

As discussed above, charging of the onboard energy storage device may proceed until a desired level of onboard energy storage has been achieved, in one example. In another example, charging of the onboard energy storage device may proceed until either the desired level of onboard energy storage has been achieved, or until vehicle operating conditions change such that charging of the onboard energy storage device may not continue. In some examples, charging of the onboard energy storage device may be a function of fuel in the fuel tank. For example, if fuel is below a threshold, then charging may be discontinued, in some examples.

Responsive to charging the onboard energy storage device via absorbing engine torque with the electric machine, and converting alternating current to direct current for storage, method 700 may end.

Turning now to FIG. 8, a high level example method 800 for conducting an engine startup, is shown. More specifically, method 800 may comprise a sub-method of method 400 depicted at FIG. 4. Method 800 may be utilized responsive to an indication that a vehicle speed is below a synchronous engine idle speed for first gear, where the engine is not indicated to be running, and where an engine start is desired.

Method 800 will be described with reference to the systems described herein and shown in FIGS. 1A-3, though it should be understood that similar methods may be applied to other systems without departing from the scope of this disclosure. Method 800 may be carried out by a controller, such as controller 12 in FIG. 1A, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), engine torque actuator(s) (e.g. 204), selector forks (e.g. 372, 376, 378, 382), first clutch actuator (e.g. 389), second clutch actuator (e.g. 387), driveline disconnect clutch actuator (e.g. 147), etc., according to the method depicted below.

Method 800 begins at 805, and may include determining a desired transmission gear for the engine startup event. The desired gear may be a function of vehicle speed, load, etc., for example. In other examples, the desired gear may be additionally or alternatively selected such that torque coordination errors between clutch capacity (e.g. DCT clutch capacity and/or driveline disconnect clutch capacity) and motor compensation torque may minimally disturb the driveline during the engine start event. In some examples, the desired gear may comprise a gear already selected via an appropriate synchronizer. However, in other examples, the desired transmission gear may not comprise a gear already selected via an appropriate synchronizer. For example, as the engine is not running, in some examples no synchronizers may be engaging any of the available gears of the dual clutch transmission. As an example, the desired gear may comprise a first gear (e.g. 320). As another example, the desired gear may comprise a top gear (e.g. seventh gear 332).

Proceeding to 810, method 800 may include locking the transmission in the desired gear. For example, if the desired gear comprises first gear (e.g. 320), then locking the transmission in the desired gear may comprise engaging the first gear with its appropriate synchronizer (e.g. 370). Alternately, if the desired gear comprises a top gear, such as seventh gear (e.g. 332), then locking the transmission in the desired gear may comprise engaging the top gear with its appropriate synchronizer (e.g. 370).

With the desired transmission gear locked, method 800 may proceed to 815. At 815, method 800 may include controlling the driveline disconnect clutch such that the driveline disconnect clutch (e.g. 137) undergoes slip during the engine starting event. More specifically, at 815, method 800 may include controlling capacity of the driveline disconnect clutch equal to driver demand. As discussed above, the driveline disconnect clutch may be hydraulically actuated in some examples, or electrically actuated in other examples.

Proceeding to 820, method 800 may include controlling electric machine (e.g. 120) speed to the minimum engine idle speed. More specifically, at 820, method 800 may include controlling the engine in a speed control mode of operation, where the speed target is set to the minimum engine idle speed. Furthermore, at 820, method 800 may include controlling electric machine feedforward torque to estimated DCT clutch capacity multiplied by the transmission gear ratio, plus driver demanded torque.

Proceeding to 825, method 800 may include commanding capacity to the appropriate clutch of the desired gear to crank the engine. More specifically, if the desired gear was either first gear (e.g. 320), or seventh gear (e.g. 332), then the appropriate clutch may comprise the first clutch (e.g. 126). Commanding increased capacity to the appropriate clutch of the desired gear to crank the engine at 825 may include commanding a capacity to the appropriate clutch to be greater than an engine cranking torque. In other words, capacity to the appropriate clutch may be controlled such that an amount of torque to crank the engine may be overcome, without resulting in slippage of the appropriate clutch. Method 800 may then end. While not explicitly illustrated, it may be understood that after the engine cranking phase as detailed by method 800, the engine may be continued to run via the vehicle controller commanding fuel injection and spark to the engine cylinders.

Turning to FIG. 9, a high level example method 900 for shutting down a vehicle engine, is shown. More specifically, method 900 may comprise a sub-method of method 400 depicted at FIG. 4. Method 900 may be utilized responsive to an indication that vehicle speed is either above or below synchronous engine idle speed for first gear, and that the engine is running, but is not still desired to be continued running.

Method 900 will be described with reference to the systems described herein and shown in FIGS. 1A-3, though it should be understood that similar methods may be applied to other systems without departing from the scope of this disclosure. Method 900 may be carried out by a controller, such as controller 12 in FIG. 1A, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as engine torque actuator(s) (e.g. 204), etc., according to the method depicted below.

Method 900 begins at 905 and may include the vehicle controller reducing an engine torque command to zero. Proceeding to 910, method 900 may include fully opening an appropriate DCT clutch. In other words, because the engine was in operation, it may be understood that in some examples engine torque may be transferred to the transmission via the first clutch (e.g. 126) or second clutch (e.g. 127). Thus, responsive to an indication that either the first clutch or second clutch is at least partially closed, the clutch that is at least partially closed may be commanded to be fully open, such that no torque may be transferred between the engine and the dual clutch transmission (e.g. 125). As discussed above, clutch capacity may be a function of pressure supplied to the clutch. Thus, fully opening the clutch may include adjusting hydraulic pressure supplied to the clutch, such that the clutch becomes fully open. As an example, no hydraulic pressure may be supplied to the clutch, such that the clutch becomes fully open. Furthermore, while not explicitly shown, it may be understood that both transmission input clutches (e.g. 126 and 127) may be commanded to fully open states, at 910.

With the engine torque commanded to zero torque, and with the DCT clutches commanded to fully open configurations, method 900 may proceed to 915. At 915, method 900 may include spinning down the engine. Spinning down the engine at 915 may include the engine speed steadily decreasing over time, the result of the engine torque commanded to zero torque, and further the result of the DCT clutches being fully opened. Responsive to engine speed decreasing below a threshold speed, method 900 may proceed to 920, and may include cutting fuel (and spark) to the engine. For example, fuel injectors (e.g. 66B) may be commanded via the controller to cease injection of fuel into the engine combustion chambers. Furthermore spark plugs (e.g. 92B) may be commanded via the controller to stop providing spark to the engine combustion chambers. Method 900 may then end.

Turning now to FIG. 10, a high level example method 1000 for conducting an engine starting procedure, is shown. More specifically, method 1000 may comprise a sub-method of method 400 depicted at FIG. 4. Method 1000 may be utilized responsive to an indication that vehicle speed is above synchronous engine idle speed for first gear, and further responsive to an indication that an engine start is desired.

Method 1000 will be described with reference to the systems described herein and shown in FIGS. 1A-3, though it should be understood that similar methods may be applied to other systems without departing from the scope of this disclosure. Method 1000 may be carried out by a controller, such as controller 12 in FIG. 1A, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), engine torque actuator(s) (e.g. 204), selector forks (e.g. 372, 376, 378, 382), first clutch actuator (e.g. 389), second clutch actuator (e.g. 387), driveline disconnect clutch actuator (e.g. 147), etc., according to the method depicted below.

Method 1000 begins at 1005, and may include locking the transmission in a top gear. For example, referring to FIG. 3, for a dual clutch transmission with seven gears (not including reverse gear), top gear may be understood to comprise the seventh gear (e.g. 332). More specifically, at 1005, locking the transmission in top gear may include the vehicle controller commanding an appropriate synchronizer (e.g. 370) to engage the top gear, such that torque may be transferred between the input shaft corresponding to the top gear, and the layshaft corresponding to the top gear. For example, in a case where top gear is seventh gear (e.g. 332), then torque may be transferred between the first input shaft (e.g. 302), and the first layshaft (e.g. 340), responsive to the vehicle controller commanding the top gear to be engaged via the appropriate synchronizer (e.g. 370).

Responsive to an indication that the top gear of the transmission has been locked, or engaged via its appropriate synchronizer, method 1000 may proceed to 1010. At 1010, method 1000 may include commanding or maintaining the driveline disconnect clutch (e.g. 137) hard locked. As discussed above, locking the driveline disconnect clutch at 1010 may include the vehicle controller sending a signal to an actuator (e.g. 147) of the driveline disconnect clutch, which may result in application of a pressure to the driveline disconnect clutch such that the driveline disconnect clutch is closed. In other examples, the driveline disconnect clutch may be electrically actuated. In some examples, locking the driveline disconnect clutch at 1010 may include commanding the driveline disconnect clutch to the maximum capacity enabled for the driveline disconnect clutch. However, in other examples, locking the driveline disconnect clutch at 1010 may include supplying an amount of pressure to the driveline disconnect clutch such that the driveline disconnect clutch does not undergo slippage during the starting of the engine.

Proceeding to 1015, method 1000 may include using the DCT clutch corresponding to the shaft associated with the locked top gear to crank the engine. For example, if top gear comprises seventh gear (e.g. 332), and where engaging the seventh gear allows for transfer of torque between the first input shaft (e.g. 302) and the first layshaft (e.g. 340), then the corresponding DCT clutch used to crank the engine may be understood to be the first clutch (e.g. 126). More specifically, at 1015, method 1000 may include the vehicle controller commanding a capacity to the appropriate clutch greater than engine cranking torque. In other words, capacity to the appropriate clutch may be controlled such that an amount of torque to crank the engine may be overcome, without resulting in excessive slippage of the appropriate clutch.

While not explicitly illustrated, in some examples, method 1000 may further include partially engaging, or in other words, applying some capacity via an appropriate synchronizer to a high gear on the shaft that does not comprise the top-gear shaft. For example, if top gear comprises seventh gear (e.g. 332), and seventh gear is associated with the first input shaft (e.g. 302) and the first layshaft (e.g. 340), then some capacity may be applied to sixth gear (e.g. 330), where sixth gear is associated with the second input shaft (e.g. 304) and the second layshaft (e.g. 342). More specifically, the vehicle controller may command an appropriate synchronizer to at least partially engage the higher gear not associated with the input shaft of the top gear. However, in some examples, method 1000 may not include applying some capacity to the higher gear not associated with the input shaft of the top gear. In a case where some capacity is applied to a synchronizer corresponding to a high gear on the shaft that does not comprise the top-gear shaft, such an action may be conducted because there may be energy stored in the non-top-gear shaft. By applying capacity to the synchronizer corresponding to the high gear on the non-top-gear shaft, positive torque may be transmitted to the wheels. Such a procedure may reduce a need for an engine starting torque reserve, for example.

Proceeding to 1020, method 1000 may include compensating for engine cranking torque with the electric machine (e.g. 120). More specifically, with the vehicle traveling at a speed greater than the synchronous engine idle speed for first gear, utilizing driveline torque to crank the engine may result in undesired vehicle deceleration if not compensated for. Accordingly, at 1020, method 1000 may include the vehicle controller commanding the electric machine (e.g. 120) to output a positive torque to the drive wheels (e.g.

131). It may be understood that the amount of positive torque output to the drive wheels may comprise an amount substantially equivalent to the amount of torque requested to crank the engine by applying capacity to the appropriate DCT clutch. More specifically, the motor torque command may equal an estimated DCT clutch capacity multiplied by the transmission gear ratio plus the driver demand torque, minus the synchronizer capacity multiplied by the synchronizer torque ratio. By commanding a positive torque via the electric machine at a level substantially equivalent to the amount of torque requested to crank the engine, driver demanded wheel torque may be maintained during the engine start event.

Turning now to FIG. 11, a high-level example method 1100 for charging an onboard energy storage device, is shown. More specifically, method 1100 may comprise a sub-method of method 400 depicted at FIG. 4. Method 1100 may be utilized responsive to an indication that a vehicle speed is greater than synchronous engine idle speed for first gear, and further responsive to an indication that the engine is in operation (e.g. combusting air and fuel), and that the engine is desired to be maintained running, or in other words, maintained engine operation is desired.

Method 1100 will be described with reference to the systems described herein and shown in FIGS. 1A-3, though it should be understood that similar methods may be applied to other systems without departing from the scope of this disclosure. Method 1100 may be carried out by a controller, such as controller 12 in FIG. 1A, and may be stored at the controller as executable instructions in non-transitory memory. Instructions for carrying out method 1100 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), engine torque actuator(s) (e.g. 204), selector forks (e.g. 372, 376, 378, 382), first clutch actuator (e.g. 389), second clutch actuator (e.g. 387), driveline disconnect clutch actuator (e.g. 147), etc., according to the method depicted below.

Method 1100 begins at 1105 and may include engaging the first gear (e.g. 320) of the dual clutch transmission (e.g. 125). For example, an appropriate synchronizer (e.g. 370) may be controlled to engage the first gear (e.g. 320), such that torque may be transferred between a first input shaft (e.g. 302) and a first layshaft (e.g. 340) of the dual clutch transmission.

Proceeding to 1110, method 1100 may include locking the appropriate DCT clutch corresponding to first gear. More specifically, with first gear locked, or engaged, via its appropriate synchronizer, at 1110, method 1100 may include commanding capacity increased to the first clutch (e.g. 126), such that torque may be transferred between the engine and the transmission. Furthermore, locking the DCT clutch at 1110 may include controlling capacity to a level where the clutch is not expected to undergo excessive slippage during the charging procedure of the onboard energy storage device.

With the DCT clutch corresponding to first gear in a locked configuration, method 1100 may proceed to 1115. At 1115, method 1100 may include locking the driveline disconnect clutch (e.g. 137). Locking the driveline disconnect clutch at 1115 may include applying a pressure to the driveline disconnect clutch such that the driveline disconnect clutch is closed. In some examples, locking the driveline disconnect clutch at 1115 may include commanding the driveline disconnect clutch to the maximum capacity enabled for the driveline disconnect clutch. However, in other examples, locking the driveline disconnect clutch at 1115 may include supplying an amount of pressure to the driveline disconnect clutch such that the driveline disconnect clutch does not undergo any slippage during the charging of the onboard energy storage device. While the above example depicts a hydraulically actuated driveline disconnect clutch, in other examples, the driveline disconnect clutch may be electrically actuated.

Proceeding to 1120, method 1100 may include producing a charging torque with the engine. For example, the engine may be controlled in a torque control mode of operation, while the electric machine may additionally be controlled in a torque control mode of operation.

Proceeding to 1125, method 1100 may include absorbing engine torque with the electric machine. In such an example, it may be understood that the electric machine may be functioning as a generator to increase a level of onboard energy storage at an onboard energy storage device (e.g. 132). More specifically, at 1125, absorbing engine torque with the electric machine may include converting alternating current generated via the electric machine to direct current for storage at the energy storage device. A first inverter system controller (ISC1) (e.g. 134) may be utilized to convert alternating current from the electric machine to direct current, for example.

As discussed above, charging of the onboard energy storage device may proceed until a desired level of onboard energy storage has been achieved, in one example. In another example, charging of the onboard energy storage device may proceed until either the desired level of onboard energy storage has been achieved, or until vehicle operating conditions change such that charging of the onboard energy storage device may not continue. In some examples, charging of the onboard energy storage device may be a function of fuel in the fuel tank. For example, if fuel is below a threshold, then charging may be discontinued, in some examples.

Responsive to charging the onboard energy storage device via absorbing engine torque with the electric machine, and converting alternating current to direct current for storage, method 1100 may end.

The methods described above with regard to FIGS. 4-11 relate to a vehicle system where the vehicle may not include a dedicated engine starter motor. More specifically, an ISG (e.g. 142) may not be included in the vehicle system, but high voltage charging and engine starting procedures may be conducted via controlling a capacity of the driveline disconnect clutch, in conjunction with controlling capacity of one or more DCT clutches. However, there may be examples where the vehicle may include an ISG, where engine starting may be desired in response to the ISG not functioning as desired. Such an example will be discussed in further detail below with regard to the methods depicted at FIGS. 13. In other examples, for example a change-of-mind event during an engine shutdown procedure, an ISG may not be able to start the engine fast enough to satisfy an acceleration request. In such an example, capacity of a clutch of the DCT may be utilized to rapidly crank the engine, as discussed above and which will be further elaborated on below with regard to FIG. 12. In still other examples, in response to a lift-pedal event, where an onboard energy storage device is unable to accept further charge, thus limiting an amount of regenerative braking that may be conducted, the engine may be rapidly started in a deceleration fuel shut off mode of operation, such that engine braking may provide a consistent vehicle deceleration expected by the vehicle operator.

Turning now to FIG. 12, a high level example method 1200 for conducting an engine start, or engine pullup, responsive to a change-of-mind event while the engine is in the process of shutting down, is shown. Such a method may be utilized in some examples either in lieu of, or in addition to, torque supplied via an ISG (e.g. 142) for cranking the engine, as will be discussed below.

Method 1200 will be described with reference to the systems described herein and shown in FIGS. 1A-3, though it should be understood that similar methods may be applied to other systems without departing from the scope of this disclosure. Method 1200 may be carried out by a controller, such as controller 12 in FIG. 1A, and may be stored at the controller as executable instructions in non-transitory memory. Instructions for carrying out method 1200 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), engine torque actuator(s) (e.g. 204), selector forks (e.g. 372, 376, 378, 382), first clutch actuator (e.g. 389), second clutch actuator (e.g. 387), etc., according to the method depicted below.

Method 1200 begins at 1205, and may include indicating whether the vehicle is in motion, and may further include indicating whether an engine shutdown is in progress. For example, it may be indicated that the vehicle is moving via one or more wheel speed sensor(s) (e.g. 195). An engine shutdown event may be commanded via the vehicle controller, for example, responsive to vehicle operating conditions. If, at 1205, it is indicated that the vehicle is not moving, and/or an engine shutdown event is not in progress, method 1205 may proceed to 1210. At 1210, method 1200 may include maintaining vehicle operating conditions. For example, if the engine is in operation, the engine may be maintained in operation. Still further, if the engine is not in operation, the engine may be maintained in a non-operative state. In a case where the vehicle is being propelled at least in part via an electric machine (e.g. 120) or electric motor(s) (e.g. 133a, 133b), then the vehicle may be continued to be propelled at least in part via the electric machine or electric motors, for example. Method 1200 may then end.

Returning to 1205, responsive to an indication that the vehicle is in motion and that an engine shutdown event is in progress, method 1200 may proceed to 1215. At 1215, method 1200 may include indicating whether a change of mind event is in progress. More specifically, a change of mind event may comprise an event for which the engine shutdown event in progress is suddenly not desired, or requested. A change of mind event may result from an unexpected change in traffic conditions, or because the vehicle operator has changed the state of one or more operator operable control devices such that the control system logic acts to re-start the engine. In such a change of mind event, it may be desirable to re-start the engine of the vehicle in as short a time as possible. Thus, such a change of mind event may comprise a vehicle operator stepping into an accelerator pedal (e.g. 192) more than a threshold amount during the engine shutdown event. Such a change of mind event may be further based on torque limits of either the electric machine (e.g.120) or electric motors (e.g. 133a, 133b). For example, if the increased desire for wheel torque via the change of mind event cannot be met via increasing torque to the wheels via either the electric machine (e.g. 120) or electric motor(s) (e.g. 133a, 133b), then an engine pullup, or engine start, may be desired.

Responsive to an indication that a change of mind event is not taking place during the engine shutdown event, method 1200 may proceed to 1220, and may include finishing engine shutdown, as described in detail at FIG. 9. Method 1200 may then end.

Returning to 1215, responsive to an indication that a change of mind event has occurred during the engine shutdown, method 1200 may proceed to 1225. At 1225, method 1200 may include using transmission clutches (e.g. 126, 127) in conjunction with the electric machine (e.g. 120), or in some examples, electric motor(s) (e.g. 133a, 133b), to re-engage and pull up the engine quickly. In some examples such a strategy may be in lieu of an ISG (e.g. 142), or in other examples, in addition to cranking torque provided via the ISG. Such a method for using transmission clutches in conjunction with the electric machine to quickly pull up the engine is depicted above at FIG. 15. Method 1200 may then end.

Proceeding to FIG. 13, a high level example method 1300 for starting an engine, is shown. More specifically, method 1300 includes indicating whether an engine start is desired, and if the vehicle is in a failure mode effects management (FMEM) condition, then the engine may be started via using transmission clutches in conjunction with either the electric machine (e.g. 120) or electric motor(s) to start the engine. Alternatively, in a case where the vehicle is not in an FMEM condition, then the engine may be started using an ISG (e.g. 142). Discussed herein, an FMEM condition may include a strategy at the vehicle controller designed to maintain vehicle operation if one or more components of the vehicle are indicated to not be functioning as desired, for example, if the ISG is indicated to not be functioning as desired.

Method 1300 will be described with reference to the systems described herein and shown in FIGS. 1A-3, though it should be understood that similar methods may be applied to other systems without departing from the scope of this disclosure. Method 1300 may be carried out by a controller, such as controller 12 in FIG. 1A, and may be stored at the controller as executable instructions in non-transitory memory. Instructions for carrying out method 1300 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), electric motor(s) (e.g. 133a, 133b), engine torque actuator(s) (e.g. 204), selector forks (e.g. 372, 376, 378, 382), first clutch actuator (e.g. 389), second clutch actuator (e.g. 387), etc., according to the method depicted below.

Method 1300 begins at 1305, and may include indicating whether the engine is off with the vehicle stopped. For example, it may be determined whether the engine is not rotating, via, for example, engine speed sensor(s) (e.g. 277). Furthermore, wheel speed sensor(s) (e.g. 195) may be utilized to determine whether the vehicle is stopped, as compared to the vehicle being in motion.

If, at 1305, it is indicated that the engine is not off and that the vehicle is not stopped, method 1300 may proceed to 1310, and may include maintaining current vehicle operation conditions. For example, if the engine is in operation, then the engine may be maintained in operation. Method 1300 may then end.

Returning to 1305, responsive to an indication that the engine is off and that the vehicle is stopped, method 1300 may proceed to 1315. At 1315, it may be determined as to whether an engine start is desired. An indication of a desired engine start may be communicated to the vehicle controller upon a vehicle operator lifting a foot off of a brake pedal (e.g. 156), pressing an accelerator pedal (e.g. 192), etc. More specifically, the vehicle may comprise a start/stop vehicle, where the engine operation is discontinued during idle stops, and where engine operation is resumed responsive to the vehicle operator releasing the brake pedal, pressing the accelerator pedal, etc. In another example, a desired engine start may be communicated to the vehicle controller upon the vehicle operator changing a state of one or more operator operable control devices such that the control system logic acts to re-start the engine.

If, at 1315, it is indicated that an engine start is not desired, method 1300 may proceed to 1310, and may include maintaining current vehicle operating conditions. For example, the engine may be maintained off and the vehicle may be maintained stopped. Method 1300 may then end.

Returning to 1315, responsive to an indication that an engine start is desired, method 1300 may proceed to 1320. At 1320, method 1300 may include indicating whether the ISG (e.g. 142) is in an FMEM condition. In other words, it may be indicated whether the ISG function is degraded, or insufficient for starting the engine. Such an indication may be communicated to the vehicle controller, for example. If, at 1320, it is indicated that the ISG is not in a FMEM condition, method 1300 may proceed to 1325. At 1325, method 1300 may include starting the engine via the ISG, in a fashion commonly known in the art. Briefly, starting the engine via the ISG may include cranking the engine via torque provided via the ISG, and then starting fuel injection and providing spark to the engine cylinders. Method 1300 may then end.

While not explicitly illustrated, in an example where the vehicle system does not include an ISG, then the vehicle may be started according to FIG. 15, as will be discussed in further detail below.

Returning to 1320, responsive to an indication that the ISG is in an FMEM condition, and further responsive to an indication that an engine start is desired, method 1300 may proceed to 1330. At 1330, method 1300 may include commanding the electric machine (e.g. 120), or in some examples commanding the electric motor(s) (e.g. 133a, 133b) to propel the vehicle to a minimum vehicle speed threshold. The minimum vehicle speed threshold may comprise a minimum vehicle speed for cranking the engine according to the method depicted at FIG. 15. Responsive to an indication that the vehicle is traveling at the minimum vehicle speed threshold, which may be indicated, for example, via wheel speed sensor(s) (e.g. 195), method 1300 may proceed to 1335. At 1335, method 1300 may include using transmission clutches (e.g. 126, 127) in conjunction with the electric machine (e.g. 120) or electric motor(s) (e.g. 133a, 133b) to pull up the engine quickly in lieu of the degraded ISG. Such a method for starting the engine is depicted above at FIG. 15. Briefly, such a method may include selecting a gear ratio via the appropriate synchronizer to achieve desired cranking engine speed during/after clutch engagement for the current vehicle speed. Such a method may further include engaging the appropriate clutch and adjusting electric machine (e.g. 120), or electric motor (e.g. 133a, 133b), torque to cancel any driveline torque disturbance resulting from the engine bump start. Method 1300 may then end.

Proceeding now to FIG. 14, a high level example method 1400 for conducting an engine start event, is shown. More specifically, responsive to a condition where the vehicle is moving and the engine is not in operation (e.g. not spinning and not combusting air and fuel), and further responsive to the vehicle operator lifting their foot off the accelerator pedal (e.g. lift pedal event), it may be determined whether the onboard energy storage device can accept further energy storage, or further charge. If it is determined that the onboard energy storage device is unable to accept further charge, then the engine may be started via use of an appropriate transmission clutch (e.g. 126, 127) to quickly pull up the engine. The engine may be pulled up in a deceleration fuel shutoff (DFSO) condition, to enable consistent vehicle deceleration via engine braking, as will be discussed in further detail below.

Method 1400 will be described with reference to the systems described herein and shown in FIGS. 1A-3, though it should be understood that similar methods may be applied to other systems without departing from the scope of this disclosure. Method 1400 may be carried out by a controller, such as controller 12 in FIG. 1A, and may be stored at the controller as executable instructions in non-transitory memory. Instructions for carrying out method 1400 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), electric motor(s) (e.g. 133a, 133b), engine torque actuator(s) (e.g. 204), selector forks (e.g. 372, 376, 378, 382), first clutch actuator (e.g. 389), second clutch actuator (e.g. 387), etc., according to the method depicted below.

Method 1400 begins at 1405 and may include indicating whether the vehicle is in motion, and whether the engine is off. As discussed above, whether the vehicle is moving may be indicated via wheel sensor(s) (e.g. 195), and the operational state of the engine may be communicated to the vehicle controller via engine speed sensor(s) (e.g. 277), status of fuel injector(s) (e.g. 66B), etc.

If, at 1405, it is indicated that the vehicle is not in motion or that the engine is in operation, method 1400 may proceed to 1410. At 1410, method 1400 may include maintaining current vehicle operating conditions. For example, if the engine is in operation, the engine may be maintained in operation, including maintaining fueling and spark to the engine. Furthermore, if the vehicle is in motion, the vehicle may be maintained in motion, without changing operating conditions related to propelling the vehicle. Method 1400 may then end.

Returning to 1405, responsive to an indication that the vehicle is in motion and that the engine is not in operation, method 1400 may proceed to 1415. At 1415, method 1400 may include determining whether a lift pedal event is indicated. For example, a lift pedal event may comprise a vehicle operator stepping off of an accelerator pedal (e.g. 192). In some examples, the lift pedal event may include the vehicle operator completely stepping off of the accelerator pedal, while in other examples the lift pedal event may include the vehicle operator stepping off of the accelerator pedal a threshold amount. If, at 1415, a lift pedal event is not indicated, method 1400 may proceed to 1420, and may include maintaining current vehicle operating conditions. For example, as the vehicle is indicated to be in motion with the engine off, it may be understood that the vehicle is traveling in an electric only mode of operation. In such a mode of operation, either the electric machine (e.g. 120), or the electric motor(s) (e.g. 133*a*, 133*b*), may be providing the propulsive power to propel the vehicle. In such a case, the vehicle may be maintained being propelled via the electric machine or electric motors, for example. Furthermore, the engine may be maintained in an off, or non-operational state. Method 1400 may then end.

Returning to 1415, responsive to an indication that the vehicle is in motion with the engine off, and further responsive to an indication of a lift pedal event, method 1400 may proceed to 1425. At 1425, method 1400 may include indicating whether the onboard energy storage device (e.g. 132) may accept further energy storage, or charge. Such a determination may include an indication of a current level of charge of the onboard energy storage device, temperature of the onboard energy storage device, etc. If, at 1425, it is indicated that the onboard energy storage device is capable of accepting further charge, method 1400 may proceed to 1430. At 1430, method 1400 may include utilizing regenerative braking (via either the electric machine or electric motor(s)) to provide consistent deceleration of the vehicle, as is commonly understood in the art. Briefly, hybrid electric vehicles, such as the vehicle depicted at FIG. 1A, FIG. 2 and FIG. 3, may provide regenerative braking, in which kinetic energy is converted by an electric motor (e.g. 120 or 133*a*, 133*b*) into storable energy during braking. The recovered energy may thus be subsequently utilized for vehicle propulsion. Method 1400 may then end.

Returning to 1425, responsive to an indication that the onboard energy storage device is not capable of accepting further charge, method 1400 may proceed to 1435. At 1435, method 1400 may include using transmission clutches (e.g. 126, 127) in conjunction with the electric machine (e.g. 120) or electric motor(s) (e.g. 133*a*, 133*b*) to quickly restart the engine. Such a method for using transmission clutches in conjunction with the electric machine to quickly pull up the engine is depicted above at FIG. 15. Significantly, starting the engine at 1435 may include cranking the engine and subsequently operating the engine in a deceleration fuel shut off (DFSO) mode of operation. For example, the engine may be operated by maintaining opening/closing of intake and exhaust valves, but where fueling and spark is not provided to each of the individual combustion chambers of the engine. By operating the engine without providing fueling and spark (e.g. in DFSO), consistent deceleration of the vehicle may be provided via engine compression braking. Method 1400 may then end.

While not explicitly illustrated, in some examples the vehicle systems described for the methods depicted at FIGS. 12-14 may include a driveline disconnect clutch (e.g. 137). In such examples, it may be understood that for each of methods 12-14, the driveline disconnect clutch may be commanded via the vehicle controller to a locked configuration during starting of the engine.

Turning now to FIG. 15, a method 1500 for executing an engine start, is shown. More specifically, method 1500 may comprise a sub-method of methods 1200, 1300, and 1400, depicted above at FIG. 12, FIG. 13, and FIG. 14, respectively.

Method 1500 will be described with reference to the systems described herein and shown in FIGS. 1A-3, though it should be understood that similar methods may be applied to other systems without departing from the scope of this disclosure. Method 1500 may be carried out by a controller, such as controller 12 in FIG. 1A, and may be stored at the controller as executable instructions in non-transitory memory. Instructions for carrying out method 1500 and the rest of the methods included herein may be executed by the controller based on instructions stored on a memory of the controller and in conjunction with signals received from sensors of the engine system, such as the sensors described above with reference to FIGS. 1A-3. The controller may employ driveline actuators such as electric machine (e.g. 120), electric motor(s) (e.g. 133*a*, 133*b*), engine torque actuator(s) (e.g. 204), selector forks (e.g. 372, 376, 378, 382), first clutch actuator (e.g. 389), second clutch actuator (e.g. 387), etc., according to the method depicted below.

Method 1500 begins at 1505 and may include estimating a minimum amount of torque to start an engine. Such an estimate may include determining engine stopping position via engine position sensor(s) (e.g. 118B), for example. Such an estimate may be further based on engine temperature, measured via engine temperature sensor(s) (e.g. 277) for example.

Subsequent to determining the minimum amount of torque to start the engine, method 1500 may proceed to 1510. At 1510, method 1500 may include determining a desired capacity to apply to an appropriate DCT clutch (e.g. 126, 127) in order to crank the engine. Such a determination may be a function of the estimated minimum amount of torque to start the engine. As an example, the desired capacity to apply to the appropriate DCT clutch may increase as the minimum amount of torque to start the engine increases, while the desired capacity to apply to the appropriate DCT clutch may decrease as the minimum amount of torque to start the engine decreases.

Proceeding to 1515, method 1500 may include determining a maximum amount of electric machine (e.g. 120) torque, or in some examples, a maximum amount of electric motor (e.g. 133*a*, 133*b*) torque. More specifically, a maximum amount of electric machine (or electric motor) torque may comprise a maximum current amount of electric machine (or electric motor) torque. Such a maximum amount may be a function of a current level of onboard energy storage, for example. Such a maximum amount may further be a function of current temperature of the electric machine (or electric motors).

Proceeding to 1520, method 1500 may include determining an amount of electric machine (or electric motor) torque available to compensate for the engine cranking torque desired to start the engine. For example, the amount of electric machine, or electric motor, torque available to compensate for engine cranking torque may comprise maximum torque (determined at step 1515) minus any electric machine or motor torque being utilized prior to attempting to start the engine. The difference may comprise an amount of electric machine torque available to compensate for engine starting torque at 1520.

Proceeding to 1525, method 1500 may include determining a desired transmission gear to engage. For example, as motor torque limits decrease, the desired gear may increase. Alternatively, as motor torque limits increase, the desired gear may decrease. The motor torque limits may comprise the amount of torque available for compensating engine cranking torque, as discussed above. Thus, as an example, consider a situation where motor torque limits are low. In such a case, a high gear, for example sixth gear (e.g. 330), may be desired. As another example, consider a situation where motor torque limits are high. In such a case, a low gear, for example second gear (e.g. 322), may be desired. Such examples are meant to be illustrative, and are not meant to be limiting.

Responsive to determining the desired transmission gear at 1525, method 1500 may proceed to 1530. At 1530, method 1500 may include determining whether the desired gear is engaged. For example, it may be determined whether an appropriate synchronizer is engaged with the desired gear. As discussed above, engaging an appropriate synchronizer with a desired gear may enable torque to be transferred between a corresponding input shaft and corresponding layshaft of the DCT. As an example, indicating whether the appropriate synchronizer is engaged with the desired gear may be carried out via synchronizer position sensor(s) (e.g. 277). If, at 1530, it is indicated that the desired transmission gear is not engaged, method 1500 may proceed to 1535, and may include controlling the DCT synchronizers to engage the desired gear. Specifically, the vehicle controller may command a shift fork actuator (e.g. 388) to control an appropriate shift fork to maneuver an appropriate synchronizer to engage the desired gear.

Responsive to an indication that the desired transmission gear is engaged, method 1500 may proceed to 1540. At 1540, method 1500 may include determining an amount of pressure to apply to the appropriate DCT clutch, to achieve the desired crank phase clutch capacity. For example, a pressure to torque transfer function may be stored at the controller, which may enable an accurate estimation of an amount of pressure to apply to the appropriate clutch to achieve the desired crank phase clutch capacity.

Proceeding to 1545, in response to determining the amount of pressure to apply to the appropriate DCT clutch to achieve the desired crank phase clutch capacity, method 1500 may include commanding the determined amount of pressure applied to the appropriate DCT clutch. More specifically, an appropriate clutch actuator (e.g. 387, 389) may be commanded via the vehicle controller to actuate a DCT clutch valve (e.g. 387A, 389A). As an example, the appropriate valve may be duty cycled such that the determined amount of pressure may be applied to the appropriate DCT clutch. More specifically, in a case where the desired gear comprises sixth gear (e.g. 330), then the appropriate clutch may comprise second clutch (e.g. 127). In such an example, the appropriate clutch actuator may comprise second clutch actuator (e.g. 387), and the appropriate clutch valve may comprise second clutch valve (e.g. 387A). Such an example is meant to be illustrative, and will be referred to further below for clarity with regard to method 1500.

Proceeding to 1550, method 1500 may include measuring DCT clutch pressure for the appropriate clutch. In the example where the desired gear is sixth gear (e.g. 330), then the appropriate clutch may comprise second clutch valve (e.g. 387A).

Continuing to 1555, method 1500 may include estimating DCT clutch capacity for the appropriate clutch. For example DCT clutch capacity for the appropriate clutch may be estimated via any means known in the art. For example, clutch torque may be estimated via an observer theory of control engineering which may comprise a method of calculating a torque that occurs when a clutch disc slips based on an engine torque. In another example, clutch torque may be estimated simply by using a value of the commanded torque. In still another example, clutch torque may be estimated using a torque measurement device.

Proceeding to 1560, method 1500 may include measuring transmission input speed and engine speed. More specifically, in the example where the desired gear comprises sixth gear (e.g. 330), and the appropriate clutch includes the second clutch (e.g. 127), then measuring transmission input speed may comprise measuring speed of the second transmission input shaft (e.g. 304). Such a measurement may conducted via one or more second input shaft speed sensor(s) (e.g. 277). Furthermore, engine speed may be indicated via engine speed sensor(s) (e.g. 277). It may be understood that for both transmission input speed and engine speed, measuring such speeds at 1560 may comprise measuring rates of change (e.g. RPM/sec) of engine speed and transmission input speed, for example.

Responsive to an indication of engine speed and transmission input speed, method 1500 may proceed to 1565. At 1565, method 1500 may include estimating engine torque. Engine torque may be estimated as a function of engine speed and transmission input speed, for example. With engine torque estimated at 1565, method 1500 may proceed to 1570. At 1570, method 1500 may include calculating an amount of torque desired to be provided via the electric machine (e.g. 120), or in some examples, via the electric motors (e.g. 133a, 133b) to compensate for slipping DCT clutch capacity. In one example, such a calculation may be a function of the current transmission gear ratio (a function of the desired gear) and the estimated DCT clutch capacity, estimated at step 1555. In another example, such a calculation may be a function of a rate of change of engine speed, provided at step 1560, and the engine torque estimate, provided at step 1565. Responsive to the calculation of the amount of torque desired to be provided via the electric machine, or electric motors, being completed, at 1570, method 1500 may further include the vehicle controller sending a signal to the electric machine (or electric motors), commanding the calculated torque amount to be produced via the electric machine (or electric motors) to compensate for the slipping DCT clutch capacity.

Proceeding to 1580, method 1500 may include determining whether the engine cranking phase is complete. More specifically the engine cranking phase may refer to a period of time where the engine does not have sufficient compression to enable the engine to be spun without an external power source, or in other words, before stable combustion has been confirmed. The engine cranking phase may thus be determined to be complete when the engine may be determined to be spinning on its own, via combustion of air and fuel. Responsive to an indication that the engine cranking phase is not yet complete, method 1500 may return to 1550. Alternatively, responsive to the engine cranking phase being indicated to be complete at 1580, method 1500 may end.

Turning now to FIG. 16, an example timeline 1600 for charging an onboard energy storage device, is shown. Timeline 1600 represents a condition where a vehicle speed is below a synchronous engine idle speed for first gear (fully stopped in example timeline 1600), where the engine is running. However, as discussed above, such an example timeline may apply to an example condition where the vehicle is traveling below synchronous engine idle speed for first gear (but is not stopped), where torque modulation via the driveline disconnect clutch (e.g. 137) is not desired, but where a brake pedal is sufficiently depressed.

Timeline 1600 includes plot 1605, indicating a speed of the vehicle, over time. The vehicle may be either stopped, or at a speed greater than (+) stopped. Line 1606 represents a synchronous engine idle speed for first gear (e.g. 320). Timeline 1600 further includes plot 1610, indicating whether a first, or current gear is locked (L) or unlocked (U), and plot 1615, indicating whether a second, or desired gear, is locked or unlocked, over time. It may be understood that "locked" may refer to an appropriate synchronizer engaging the first (or second) gear, and unlocked may refer to a condition where an appropriate synchronizer is not engaging the first (or second) gear. Timeline 1600 further includes plot 1620, indicating a first clutch state, and plot 1625, indicating a second clutch state, over time. It may be understood that "first clutch" may coordinate torque transfer between the engine and transmission via the first gear illustrated by plot 1610, while "second clutch" may coordinate torque transfer between the engine and transmission via the second gear illustrated by plot 1615. Both the first clutch and second clutch may be open (O) or closed (C), or somewhere in between (e.g. partially open, or partially closed).

Timeline 1600 further includes plot 1630, indicating whether a driveline disconnect clutch (e.g. 137) is open (O) or closed (C), over time. Timeline 1600 further includes plot 1635, indicating an engine speed, over time. Line 1636 represents an arbitrary engine speed target, which may comprise idle speed, or elevated idle speed, for example. Timeline 1600 further includes plot 1640, indicating an engine torque, and plot 1645, indicating an electric machine (e.g. 120) torque, over time. Torque may be either 0, or positive (+) or negative (−). Timeline 1600 further includes plot 1650, indicating whether charging of an onboard energy storage device (e.g. 132) is desired (Y), or not (N), over time.

At time t0, the vehicle is stopped, thus vehicle speed is below synchronous engine idle speed for first gear, represented by plot 1605. The current, or first gear, is engaged (locked) via its appropriate synchronizer, indicated by plot 1610. The second gear, is not engaged (unlocked), indicated by plot 1615. Both clutches (e.g. 126, 127) are in an open configuration, and the driveline disconnect clutch is closed. The electric machine is not producing torque, indicated by plot 1645, and charging of the onboard energy storage device is not indicated to be desired, indicated by plot 1650.

At time t1, charging of the onboard energy storage device is indicated to be desired. Such an indication may be related to a level of onboard energy storage being below a threshold, for example. Accordingly, a desired transmission gear is determined. The desired gear may comprise a gear that enables the most energy efficient charging of the onboard energy storage device, and may be a function of engine speed, engine load, temperature of the electric machine, etc. The desired gear may comprise a gear selected to prevent the electric machine from being clipped by its torque limit in a constant region of an electric machine curve. Accordingly, at time t1, the first, or current gear, is disengaged, or unlocked via its appropriate synchronizer. Furthermore, the driveline disconnect clutch is commanded via the controller to an open configuration. The open configuration may comprise a configuration where any torque upstream of the driveline disconnect clutch is not transferred to drive wheels, for example. Furthermore, the engine is controlled in a speed control mode of operation to a target speed, represented by line 1636. As mentioned above, the target speed may comprise engine idle or elevated engine idle speed. Engine torque increases accordingly, illustrated by plot 1640.

At time t2, the desired gear is engaged via its appropriate synchronizer. At time t3, the second clutch, indicated by plot 1625, is commanded closed. With the second clutch commanded closed, it may be understood that engine torque may be transferred to the transmission via the second gear, or desired gear. To absorb engine torque in order to increase the level of onboard energy storage at the energy storage device, the electric machine is controlled in a torque control mode of operation. Thus, between time t3 and t4, engine torque is absorbed via the electric machine, for storage at the onboard energy storage device. While the example timeline depicts producing a charging torque via the engine in speed control mode and absorbing the engine torque via the electric machine in torque control mode, in an alternative example the engine may be controlled in torque control mode and the electric machine in speed control with a speed control target corresponding to the desired engine speed.

At time t4, charging of the onboard energy storage device is no longer indicated to be desired. For example, further charging may not be desired in response to a charge of the onboard energy storage device exceeding a threshold. Thus, the second clutch is opened, such that engine torque is no longer transferred to the transmission. Between time t4 and t5, engine speed is reduced to the engine speed prior to conducting the charging operation, and engine torque decreases accordingly. Furthermore, electric machine torque is reduced to zero between time t4 and t5.

At time t5, the desired gear, indicated by plot 1615, is disengaged via its appropriate synchronizer, and the driveline disconnect clutch is commanded closed, indicated by plot 1730. At time t6, the gear that was engaged prior to the charging operation, is re-engaged (e.g. first, or current, gear re-engaged) via its appropriate synchronizer. Between time t6 and t7, the vehicle is maintained at the speed below synchronous engine idle speed for first gear.

While not explicitly illustrated in timeline 1600, it may be understood that instead of controlling the engine in speed control mode and the electric machine in torque control mode, the engine may alternately be controlled in torque control mode, with the electric machine in speed control mode, as discussed above with regard to the method depicted at FIG. 5.

Proceeding to FIG. 17, another example timeline 1700 for charging an onboard energy storage device, is indicated. Timeline 1700 represents a condition where a vehicle speed is below a synchronous engine idle speed, but is not fully stopped, and where torque modulation via a driveline disconnect clutch (e.g. 137) is desired. Timeline 1700 includes plot 1705 indicating a speed of the vehicle, over time. The vehicle may be either stopped, or at a speed greater than (+) stopped. Line 1706 represents a synchronous engine idle speed for first gear (e.g. 320). Timeline 1700 further includes plot 1710, indicating whether a first, or current gear is locked (L) or unlocked (U), and plot 1715, indicating whether a second, or desired gear, is locked or unlocked, over time. It may be understood that "locked" may refer to an appropriate synchronizer engaging the first (or second) gear, and unlocked may refer to a condition where an appropriate synchronizer is not engaging the first (or second) gear. Timeline 1700 further includes plot 1720, indicating a first clutch state, and plot 1725, indicating a second clutch state, over time. It may be understood that "first clutch" may coordinate torque transfer between the engine and transmission via the first gear illustrated by plot 1710, while "second clutch" may coordinate torque transfer between the engine and transmission via the second gear illustrated by plot 1715. Both the first clutch and second clutch may be open (O) or closed (C), or may be somewhere in between (e.g. partially open, or partially closed).

Timeline 1700 further includes plot 1730, indicating whether a driveline disconnect clutch (e.g. 137) is open (O) or closed (C), over time. Line 1731 represents a driveline disconnect clutch capacity equaling driver demand. Timeline 1700 further includes plot 1735, indicating an engine speed, over time. Timeline 1700 further includes plot 1740, indicating an engine torque, and plot 1745, indicating an electric machine (e.g. 120) torque, over time. Torque may be either 0, or positive (+) or negative (−). Timeline 1700 further includes plot 1750, indicating whether charging of an onboard energy storage device (e.g. 132) is desired (Y), or not (N), over time.

At time t0, the vehicle is below synchronous engine idle speed for first gear, illustrated by plot 1705, however it may be understood that the vehicle is not stopped. The current, or first gear, is engaged (locked) via its appropriate synchronizer, indicated by plot 1710. The second gear, is not engaged (unlocked), indicated by plot 1715. The first DCT clutch is closed, illustrated by plot 1720, thus it may be understood that engine torque may be transferred through the transmission, via the first, or current gear. The second DCT clutch is open, illustrated by plot 1725. The driveline disconnect clutch is partially closed (e.g. slipping), illustrated by plot 1730, enabling the vehicle to be propelled at a speed lower than the synchronous engine idle speed for first gear. The electric machine is not producing torque, indicated by plot 1745, and charging of the onboard energy storage device is not indicated to be desired, indicated by plot 1750. The engine is producing a small amount of torque to propel the vehicle, illustrated by plot 1740, and engine speed is correspondingly low, illustrated by plot 1735.

At time t1, charging of the onboard energy storage device is indicated to be desired. Such an indication may be related to a level of onboard energy storage being below a threshold, for example. Furthermore, while not explicitly illustrated it may be understood that torque modulation via the driveline disconnect clutch, is additionally desired for the charging event. Accordingly, a desired transmission gear is determined. The desired gear may comprise a gear that enables the most energy efficient charging of the onboard energy storage device, and may be a function of engine speed, engine load, temperature of the electric machine, etc. The desired gear may comprise a gear selected to prevent the electric machine from being clipped by its torque limit in a constant region of an electric machine curve. Accordingly, at time t1, the first, or current gear, is disengaged, or unlocked via its appropriate synchronizer, and the first clutch is commanded open. Furthermore, the driveline disconnect clutch is commanded via the controller to a position in between closed and open. More specifically, capacity to the driveline disconnect clutch is commanded to a capacity equal to driver demand, for example, represented by line 1731. Furthermore, the engine is controlled in a speed control mode of operation to a target speed. Engine torque increases accordingly, illustrated by plot 1740.

At time t2, the desired gear is engaged via its appropriate synchronizer. At time t3, the second clutch, indicated by plot 1725, is commanded closed. With the second clutch commanded closed, it may be understood that engine torque may be transferred to the transmission via the second gear, or desired gear. To absorb engine torque in order to increase the level of onboard energy storage at the energy storage device, the electric machine is controlled in a torque control mode of operation. Thus, between time t3 and t4, engine torque is absorbed via the electric machine. While the above example depicts controlling the engine in a speed control mode, and controlling the electric machine in a torque control mode, it may be understood that in another example, the engine may be controlled in a torque control mode with the electric machine in a speed control mode of operation, with a speed control target corresponding to desired engine speed.

At time t4, charging of the onboard energy storage device is no longer indicated to be desired. Thus, the second clutch is opened, such that engine torque is no longer transferred to the transmission. Between time t4 and t5, engine speed is reduced to the engine speed prior to conducting the charging operation, and engine torque decreases accordingly. Furthermore, electric machine torque is reduced to zero between time t4 and t5.

At time t5, the desired gear, indicated by plot 1715, is disengaged via its appropriate synchronizer, and the driveline disconnect clutch is commanded to the capacity commanded prior to the charging event, illustrated by plot 1730. At time t6, the gear that was engaged prior to the charging operation, is re-engaged (e.g. first, or current, gear re-engaged) via its appropriate synchronizer, and the first clutch is commanded closed. Between time t6 and t7, the vehicle is maintained at the speed below synchronous engine idle speed for first gear.

Proceeding to FIG. 18, another example timeline 1800 for charging an onboard energy storage device, is indicated. Timeline 1800 represents a condition where a vehicle speed is below a synchronous engine idle speed, but is not fully stopped, and where torque modulation via a driveline disconnect clutch (e.g. 137) is not desired, and where a brake pedal is not sufficiently depressed. Timeline 1800 includes plot 1805, indicating a vehicle speed, over time. The vehicle may be either stopped, or at a speed greater than (+) stopped. Line 1806 represents a synchronous engine idle speed for first gear (e.g. 320). Timeline 1800 further includes plot 1810, indicating whether a first, or desired gear is locked (L) or unlocked (U), and plot 1815, indicating whether a second, or current gear, is locked or unlocked, over time. It may be understood that "locked" may refer to an appropriate synchronizer engaging the first (or second) gear, and unlocked may refer to a condition where an appropriate synchronizer is not engaging the first (or second) gear. Timeline 1800 further includes plot 1820, indicating a first clutch state, and plot 1825, indicating a second clutch state, over time. It may be understood that "first clutch" may coordinate torque transfer between the engine and transmission via the first gear illustrated by plot 1810, while "second clutch" may coordinate torque transfer between the engine and transmission via the second gear illustrated by plot 1815. Both the first clutch and second clutch may be open (O) or closed (C), or somewhere in between (e.g. partially open, or partially closed).

Timeline 1800 further includes plot 1830, indicating whether a driveline disconnect clutch (e.g. 137) is open (O) or closed (C), over time. Timeline 1800 further includes plot 1835, indicating an engine speed, over time. Timeline 1800 further includes plot 1840, indicating an engine torque, and plot 1845, indicating an electric machine (e.g. 120) torque, over time. Torque may be either 0, or positive (+) or negative (−). Timeline 1800 further includes plot 1850, indicating whether charging of an onboard energy storage device (e.g. 132) is desired (Y), or not (N), over time.

At time t0, the vehicle is below synchronous engine idle speed for first gear, illustrated by plot 1805, however it may be understood that the vehicle is not stopped. The first gear, is not engaged (unlocked) via its appropriate synchronizer, indicated by plot 1810. The second gear, or current gear, is engaged (locked), indicated by plot 1815. The second clutch is closed, illustrated by plot 1825, while the first clutch is open, illustrated by plot 1820. The driveline disconnect clutch is partially closed (e.g. slipping), illustrated by plot 1830. The electric machine is not producing torque, indicated by plot 1845, and charging of the onboard energy storage device is not indicated to be desired, indicated by plot 1850. The engine is producing a small amount of torque to propel the vehicle, illustrated by plot 1840, and engine speed is correspondingly low, illustrated by plot 1835.

At time t1, charging of the onboard energy storage device is indicated to be desired. Such an indication may be related to a level of onboard energy storage being below a threshold, for example. Furthermore, while not explicitly illustrated it may be understood that torque modulation via the driveline disconnect clutch, is not additionally desired for the charging event. Accordingly, a desired transmission gear is determined. The desired gear may comprise a gear that enables the most energy efficient charging of the onboard energy storage device, and may be a function of engine speed, engine load, temperature of the electric machine, etc. The desired gear may comprise a gear selected to prevent the electric machine from being clipped by its torque limit in a constant region of an electric machine curve. In example timeline 1800, it may be understood that the desired gear comprises first transmission gear (e.g. 320). Accordingly, at time t1, the current gear, illustrated by plot 1815, is disengaged, or unlocked via its appropriate synchronizer, and the second clutch is commanded open via the vehicle controller. Furthermore, the driveline disconnect clutch is commanded closed via the controller. Still further, the engine is controlled in a torque control mode of operation to a target torque. Engine speed increases accordingly, illustrated by plot 1840.

At time t2, the desired gear (e.g. first gear 320) is engaged via its appropriate synchronizer. At time t3, the first clutch, indicated by plot 1820, is commanded closed. With the first clutch commanded closed, it may be understood that engine torque may be transferred to the transmission via the desired gear (e.g. 320). Thus, in example timeline 1800, because the desired gear comprises the first transmission gear (e.g. 320), then first clutch represented by plot 1820 may be understood to comprise the first clutch (e.g. 126). To absorb engine torque in order to increase the level of onboard energy storage at the energy storage device, the electric machine is controlled in a torque control mode of operation. Thus, between time t3 and t4, engine torque is absorbed via the electric machine.

At time t4, charging of the onboard energy storage device is no longer indicated to be desired. Thus, the first clutch is opened, such that engine torque is no longer transferred to the transmission. Between time t4 and t5, engine torque is reduced to the engine torque prior to conducting the charging operation, and engine speed decreases accordingly. Furthermore, electric machine torque is reduced to zero between time t4 and t5.

At time t5, the desired gear (e.g. first gear 320), indicated by plot 1810, is disengaged via its appropriate synchronizer, and the driveline disconnect clutch is controlled to its capacity prior to the charging event, illustrated by plot 1830. At time t6, the gear that was engaged prior to the charging operation, is re-engaged (e.g. second, or current, gear re-engaged) via its appropriate synchronizer, and the second clutch is commanded closed via the vehicle controller. Between time t6 and t7, the vehicle is maintained at the speed below synchronous engine idle speed for first gear.

While not explicitly shown, such a charging procedure as described in timeline 1800 may additionally apply to a condition where vehicle speed is above the synchronous engine idle speed for first gear.

Turning now to FIG. 19, an example timeline 1900 for starting a vehicle engine, is shown. Timeline 1900 represents a condition where a vehicle speed is below a synchronous engine idle speed for first gear, where the engine is running. Timeline 1900 includes plot 1905, indicating a speed of the vehicle, over time. The vehicle may be either stopped, or at a speed greater than (+) stopped. Line 1906 represents a synchronous engine idle speed for first gear (e.g. 320). Timeline 1900 further includes plot 1910, indicating whether a first, or current gear is locked (L) or unlocked (U), and plot 1915, indicating whether a second, or desired gear, is locked or unlocked, over time. It may be understood that "locked" may refer to an appropriate synchronizer engaging the first (or second) gear, and unlocked may refer to a condition where an appropriate synchronizer is not engaging the first (or second) gear. Timeline 1900 further includes plot 1920, indicating a first clutch state, and plot 1925, indicating a second clutch state, over time. It may be understood that "first clutch" may coordinate torque transfer between the engine and transmission via the first gear illustrated by plot 1910, while "second clutch" may coordinate torque transfer between the engine and transmission via the second gear illustrated by plot 1915. Both the first clutch and second clutch may be open (O) or closed (C).

Timeline 1900 further includes plot 1930, indicating whether a driveline disconnect clutch (e.g. 137) is open (O) or closed (C), over time. Line 1931 represents a capacity of the driveline disconnect clutch equal to driver demand. Timeline 1900 further includes plot 1935, indicating an electric machine speed, over time. Line 1936 represents a minimum engine idle speed. Timeline 1900 further includes plot 1940, illustrating an electric machine torque, over time. Line 1941 represents a motor feedforward torque that is equal to an estimated DCT clutch capacity multiplied by a transmission gear ratio, plus driver demand torque. Timeline 1900 further includes plot 1945, indicating an engine speed, over time. Timeline 1900 further includes plot 1950, indicating whether an engine start is desired, and plot 1955, indicating whether an engine cranking phase is complete, over time.

At time t0, the vehicle speed is below synchronous engine idle speed for first gear, illustrated by plot 1905. The current, or first gear, is engaged (locked) via its appropriate synchronizer, indicated by plot 1910. The second gear is not engaged (unlocked), indicated by plot 1915. Both clutches (e.g. 126, 127) are in an open state, and the driveline disconnect clutch is closed, illustrated by plot 1930. Electric machine speed, illustrated by plot 1935, is slightly greater than 0 RPM, and electric machine torque is slightly greater than 0 N·m. Engine speed, illustrated by plot 1945, is at 0 RPM, indicating that the engine is not in operation. An engine start is not indicated to be desired, illustrated by plot 1950, and accordingly, engine crank phase is not indicated to be complete, illustrated by plot 1955.

At time t1, an engine start is indicated to be desired. Such an indication may be related to a request for vehicle acceleration that exceeds a torque limit of the electric machine (e.g. 120), a vehicle-operator requested usage of energy-consuming vehicle components, etc. Accordingly, a desired transmission gear is determined. The desired gear may be a function of vehicle speed, for example. In another example, the desired gear may be selected such that torque coordination between clutch capacity and electric machine compensation torque may minimally disturb the driveline. Accordingly, at time t1, the first, or current, gear is disengaged via its appropriate synchronizer. Furthermore, the driveline disconnect clutch is commanded via the controller to a capacity equal to driver demand, represented by line 1931. Furthermore, the electric machine (e.g. 120) is controlled in a speed control mode of operation to a target speed, where the target speed equals minimum engine idle speed, represented by line 1936. Electric machine feedforward torque is set to an estimated DCT clutch capacity multiplied by the transmission gear ratio plus the driver demand torque, represented by line 1941.

At time t2, the desired gear is engaged via its appropriate synchronizer. At time t3, the second clutch, indicated by plot 1925, is commanded closed. With the second clutch commanded closed, it may be understood that engine torque may be transferred to the transmission via the second gear, or desired gear. Thus, by commanding closed the second clutch at time t3, driveline torque may be transferred from the transmission to the engine, in order to crank the engine. Accordingly, between time t3 and t4, engine speed increases, indicating that the engine is rotating, or being cranked via the driveline torque. In this way, the engine may be cranked without a supplemental engine starter motor, or ISG, for example.

At time t4, it is indicated that the engine cranking phase is complete, and as such, an engine start procedure is no longer indicated to be desired. Between time t4 and t5, electric machine speed is reduced to the electric machine speed prior to conducting the engine start operation. As such, electric machine torque decreases accordingly. At time t6 the driveline disconnect clutch, illustrated by plot 1930, is commanded closed. Between time t6 and t7, the vehicle speed increases above the synchronous engine idle speed for first gear, as the engine has been started running, and as engine torque is being transferred between the engine and the transmission to drive wheels, via the second clutch being closed, and the desired gear being engaged, or locked.

Turning now to FIG. 20, an example timeline 2000 for conducting an engine starting procedure, is shown. Timeline 2000 represents a condition where a vehicle speed is above a synchronous engine idle speed for first gear, where the engine is not running. Timeline 2000 includes plot 2005, indicating a vehicle speed, over time. The vehicle may either be stopped, or at a speed greater than (+) stopped. Line 2006 represents a synchronous engine idle speed for first gear (e.g. 320). Timeline 2000 further includes plot 2010, indicating whether a first, or top gear is locked (L) or unlocked (U), and plot 2015, indicating whether a second, or current gear, is locked or unlocked, over time. In example timeline 2000, it may be understood that first gear may refer to a "top" transmission gear, where top transmission gear may refer to seventh gear (e.g. 332). It may be further understood that "locked" may refer to an appropriate synchronizer engaging the first (or second) gear, and unlocked may refer to a condition where an appropriate synchronizer is not engaging the first (or second) gear. Timeline 2000 further includes plot 2020, indicating a first clutch state, and plot 2025, indicating a second clutch state, over time. It may be understood that "first clutch" may coordinate torque transfer between the engine and transmission via the first gear illustrated by plot 2010, while "second clutch" may coordinate torque transfer between the engine and transmission via the second gear illustrated by plot 2015. Both the first clutch and second clutch may be open (O) or closed (C), or some capacity in between. Line 2021 represents an amount of torque to crank the engine.

Timeline 2000 further includes plot 2030, indicating whether a driveline disconnect clutch (e.g. 137) is open (O) or closed (C), over time. Timeline 2000 further includes plot 2035, indicating an electric machine (e.g. 120) speed, over time. Timeline 2000 further includes plot 2040, illustrating an electric machine torque, over time. Line 2041 represents an amount of torque equaling an estimated DCT clutch capacity multiplied by the transmission gear ration plus the driver demand torque, minus the synchronizer capacity multiplied by the synchronizer torque ratio.

Timeline 2000 further includes plot 2045, indicating an engine speed, over time. Timeline 2000 further includes plot 2050, indicating whether an engine start is desired, and plot 2055, indicating whether an engine cranking phase is complete, over time.

At time t0, the vehicle speed is above synchronous engine idle speed for first gear, illustrated by plot 2005. The first gear is not engaged (unlocked), indicated by plot 2010, while the second, or current gear, is engaged (locked), indicated by plot 2015. Both clutches (e.g. 126, 127) are in an open state, and the driveline disconnect clutch is closed, illustrated by plot 2030. Electric machine speed, illustrated by plot 2035, is greater than 0 RPM, and electric machine torque is greater than 0 N·m. Engine speed, illustrated by plot 2045, is at 0 RPM, indicating that the engine is not in operation. An engine start is not indicated to be desired, illustrated by plot 2050, and accordingly, engine crank phase is not indicated to be complete, illustrated by plot 2055.

At time t1, an engine start is indicated to be desired. Such an indication may be related to a request for vehicle acceleration that exceeds a torque limit of the electric machine (e.g. 120), a vehicle-operator requested usage of energy-consuming vehicle components, etc. Accordingly, a desired transmission gear is determined. The desired gear may be a function of vehicle speed, for example. In some examples, the desired gear may be selected such that torque coordination between clutch capacity and electric machine compensation torque may minimally disturb the driveline. Accordingly, at time t1, the second, or current, gear is disengaged via its appropriate synchronizer. Furthermore, the driveline disconnect clutch is commanded or maintained closed, illustrated by plot 2030.

At time t2, the desired gear is engaged via its appropriate synchronizer. In example timeline 2000, it may be understood that the desired gear comprises the top, or highest gear. Thus, in example timeline 2000, it may be understood that top gear may comprise seventh gear (e.g. 332). At time t3, the first clutch, indicated by plot 2020, is commanded closed. With the first clutch commanded closed, it may be understood that engine torque may be transferred to the transmission via the first gear, or desired (e.g. top) gear. By commanding closed the first clutch at time t3, driveline torque may thus be transferred from the transmission to the engine, in order to crank the engine.

While the engine is being cranked, the electric machine may be utilized to compensate for the engine cranking torque. Thus, at time t3, electric machine torque is controlled to an amount equal to estimated DCT clutch capacity multiplied by the transmission gear ratio plus driver demand torque, minus the synchronizer capacity multiplied by the synchronizer torque ratio, illustrated by line 2041.

Between time t3 and t4, engine speed increases, indicating that the engine is rotating, or being cranked via the driveline torque. In this way, the engine may be cranked without a supplemental engine starter motor, or ISG, for example. Torque utilized to crank the engine is compensated for between time t3 and t4 via the electric machine, illustrated by plot 2040.

At time t4, it is indicated that the engine cranking phase is complete, and as such, an engine start procedure is no longer indicated to be desired. Furthermore, at time t4, the first clutch is commanded open. Between time t4 and t5, electric machine speed is reduced to the electric machine speed prior to conducting the engine start operation (0 RPM in this example timeline 1900). As such, electric machine torque decreases accordingly. At time t5 a gear change is desired, as top gear may not be ideal for driver demand. Accordingly, at time t5, the top gear is disengaged (unlocked) via its appropriate synchronizer, to a neutral state. Subsequently, at time t6, the second gear is locked via its appropriate synchronizer. In example timeline 2000, it is illustrated that the second gear was engaged prior to the engine start, and is re-engaged subsequent to the start event. However, such an example is for simplicity, and it some examples, after the engine start another gear may be engaged. More specifically, any gear may be engaged after the engine start to appropriately meet driver demand.

With both the first clutch and the second clutch in open configurations, the vehicle is propelled via electric machine torque between time t6 and t7. However, such an example is illustrative and is not meant to be limiting. In some examples, after the cranking phase is complete, and after any gear shifts have taken place, an appropriate DCT clutch may be commanded closed such that engine torque may be transferred through the transmission to driven wheels, in order to propel the vehicle with assistance from the engine.

Turning now to FIG. 21, an example timeline 2100 for conducting an engine starting operation, is shown. Example timeline 2100 illustrates pulling up the engine in a deceleration shut shut off condition, such that the engine may be utilized to help brake the vehicle (e.g. engine braking). Timeline 2100 includes plot 2105, indicating vehicle speed, over time. The vehicle may be stopped, or may be traveling at a speed greater than (+) stopped. Timeline 2100 further includes plot 2110, indicating a first gear state, and plot 2115, indicating a second gear state, over time. Both the first gear and the second gear of the DCT may be locked (L), or unlocked (U). Timeline 2100 further includes plot 2120 indicating a first clutch state, and plot 2125, indicating a second clutch state, over time. Both the first clutch of the DCT and the second clutch of the DCT, may be open (O) or closed (C), or somewhere between (e.g. partially open, or partially closed). Timeline 2100 further includes plot 2130, indicating an energy storage level of an onboard energy storage device (e.g. 132), over time. Line 2131 represents a threshold, above which the onboard energy storage device may not be capable of accepting substantial further charge. Timeline 2100 further includes plot 2135, indicating an electric machine (e.g. 120) torque, over time. Timeline 2100 further includes plot 2140, indicating whether fuel injection to the engine is on, or off, over time. Timeline 2100 further includes plot 2145, indicating an engine speed, over time. Timeline 2100 further includes plot 2150, indicating whether an engine startup event is desired (Y), or not (N), and plot 2155, indicating whether an engine crank phase is complete (Y), or not (N), over time.

At time t0, the vehicle is in operation, and is being propelled via torque from the electric machine, illustrated by plot 2135. Both the first gear and the second gear are engaged via appropriate synchronizers, however both the first clutch and the second clutch are open. As such, no torque is transferred between the engine and the transmission. As discussed herein with regard to FIG. 21, it may be understood that the first clutch controls torque transfer between the engine and transmission output via the first gear, and it may be further understood that the second clutch controls torque transfer between the engine and transmission output via the second gear. An energy storage level of the onboard energy storage device is greater than the threshold, represented by line 2131. As the engine is off, fuel injection via fuel injector(s) (e.g. 66B) is additionally off, illustrated by plot 2140. Engine speed is at 0 RPM, illustrated by plot 2145, an engine start is not indicated to be desired, illustrated by plot 2150, and accordingly, an engine crank phase is not indicated to be complete, illustrated by plot 2155.

At time t1, an engine start is desired. In this example timeline, it may be understood that the engine start may be the result of a lift-pedal event. In other words, with the vehicle traveling and being propelled via the electric machine, a lift pedal event may in some examples result in the vehicle conducting a regenerative braking operation, to slow the vehicle. However, at time t1, it is additionally indicated that the energy storage level of the energy storage device (e.g. 132) is such that the energy storage device cannot accept substantial further charge. Accordingly, regenerative braking may not be utilized to slow the vehicle. As such, an engine start event is indicated to be desired at time t1, to pull up the engine for use in compression braking, as will be discussed in further detail below.

Between time t1 and t2, a desired gear for pulling the engine up may be selected. As discussed above, in some examples, the desired gear may be a function of vehicle speed, etc. In some examples, the desired gear may comprise a high gear (e.g. sixth or seventh gear) such that torque disturbances during the engine start event are reduced as much as possible. In the example timeline 2100, it may be understood that the desired gear, also referred to here with regard to timeline 2100 as second gear, is already in a locked, or engaged conformation via its appropriate synchronizer. Thus, at time t2, the second clutch is commanded closed. By commanding closed the second clutch, torque may be transferred between the transmission and the engine, via the second gear being engaged. In other words, driveline torque may be utilized to crank the engine, responsive to the second clutch being commanded closed via the vehicle controller.

Between time t2 and t3, driveline torque is utilized to crank the engine and the electric machine is controlled via the vehicle controller to offset, or compensate for the driveline torque utilized to crank the engine. An amount of electric machine torque to be utilized to compensate for engine cranking torque may be a function of transmission gear ratio and estimated DCT clutch capacity, for example. In an alternative example, electric machine compensation torque may be a function of rate of change of engine speed and an engine torque estimate. As the electric machine is utilized to compensate for engine cranking torque, the energy storage level continues to decline between time t2 and t3.

At time t3, it is indicated that the engine cranking phase is complete. Thus, an engine start event is no longer indicated to be desired. However, rather than begin fuel injection to the engine, the engine is brought up in a deceleration fuel shut off (DFSO) mode of engine operation, without fuel and spark being provided to the engine. In this way, the engine may provide engine braking as a means of enabling a consistent lift pedal deceleration feel under circumstances where the onboard energy storage device cannot accept additional charge.

Accordingly, at time t3, the second clutch is commanded open, such that torque may no longer be transferred between the engine and the DCT. Between time t3 and t4, electric machine torque is lowered to a value at or below the value of torque it was providing to the driven wheels prior to the engine start event. Between time t4 and t5, electric machine torque is further lowered, responsive to the lift-pedal event where the vehicle operator is requesting less wheel torque. Accordingly, between time t4 and t5, vehicle speed decreases, the combination of reduction in electric machine torque and slowing of the vehicle via engine braking.

In this way, engine starting and charging of an onboard energy storage device may be achieved for a variety of vehicle operating conditions, without the use of a dedicated starter motor, and without introducing unacceptable driveline torque disturbance during the engine starting and energy storage device charging procedures.

The technical effect is to recognize that introduction of a driveline disconnect downstream of an electric machine, in a vehicle where the electric machine is downstream of an engine and a dual clutch transmission, may enable efficient charging of an onboard energy storage device under a wide variety of vehicle operating conditions. By controlling the driveline disconnect clutch, charging of an onboard energy storage device may be conducted while the vehicle is stationary, moving below a threshold speed, moving greater than a threshold speed, etc.

The systems described herein, and with reference to FIGS. 1A-3, along with the methods described herein, and with reference to FIGS. 4-15, may enable one or more systems and one or more methods. In one example, a method comprises charging an onboard energy storage device of a vehicle through a dual clutch transmission via an electric machine positioned downstream of the dual clutch transmission by producing a charging torque with an engine positioned upstream of the dual clutch transmission and controlling a driveline disconnect clutch positioned downstream of the electric machine. In a first example of the method, the method further includes wherein a speed of the vehicle is below a predetermined threshold, and wherein the predetermined threshold includes vehicle speed below a synchronous engine idle speed for a first, or lowest, gear of the dual clutch transmission. A second example of the method optionally includes the first example, and further includes wherein controlling the driveline disconnect clutch further comprises fully opening the driveline disconnect clutch under conditions where the vehicle is fully stopped or under conditions where a brake pedal is depressed greater than a predetermined amount. A third example of the method optionally includes the first and second examples, and further includes wherein controlling the driveline disconnect clutch further comprises slipping the driveline disconnect clutch under conditions where the vehicle is not fully stopped, but where torque modulation via the driveline disconnect clutch is desired. A fourth example of the method optionally includes any one or more or each of the first through third examples, and further includes wherein controlling the driveline disconnect clutch further comprises fully closing the driveline disconnect clutch under conditions where the vehicle is not fully stopped, and where torque modulation via the driveline disconnect clutch is not desired. A fifth example of the method optionally includes any one or more or each of the first through fourth examples, and further comprises controlling the electric machine to a desired torque and controlling the engine to a desired speed for charging the energy storage device. A sixth example of the method optionally includes any one or more or each of the first through fifth examples, and further comprises controlling the engine to a desired torque and controlling the electric machine to a desired speed for charging the energy storage device. A seventh example of the method optionally includes any one or more or each of the first through sixth examples, and further comprises controlling the engine to a desired torque and controlling the electric machine to a desired torque for charging the energy storage device. An eighth example of the method optionally includes any one or more or each of the first through seventh examples, and further comprises engaging a desired gear of the dual clutch transmission via a corresponding synchronizer, and locking a clutch of the dual clutch transmission, the clutch corresponding to a gear shaft of the desired gear.

Another example of a method comprises charging an onboard energy storage device of a vehicle through a dual clutch transmission via an electric machine positioned downstream of the dual clutch transmission by producing a charging torque with an engine positioned upstream of the dual clutch transmission and controlling a driveline disconnect clutch positioned downstream of the electric machine, under conditions where a speed of the vehicle is greater than a predetermined threshold. In a first example of the method, the method further comprises engaging a first, or lowest, gear of the dual clutch transmission via a synchronizer, and locking a clutch of the dual clutch transmission, the clutch corresponding to a gear shaft of the first, or lowest, gear. A second example of the method optionally includes the first example, and further includes wherein controlling the driveline disconnect clutch further comprises locking the driveline disconnect clutch. A third example of the method optionally includes any one or more or each of the first and second examples, and further includes wherein the predetermined threshold includes vehicle speed above a synchronous engine idle speed for a first, or lowest, gear of the dual clutch transmission. A fourth example of the method optionally includes any one or more or each of the first through third examples, and further comprises controlling the engine to a desired torque and controlling the electric machine to a desired torque for charging the energy storage device.

An example of a system comprises an engine without an auxiliary engine starting device; a dual clutch transmission with a plurality of gears positioned downstream of the engine including a first, or lowest, gear of the dual clutch transmission; an electric machine positioned downstream of the dual clutch transmission; a driveline disconnect clutch positioned downstream of the electric machine; an onboard energy storage device; and a controller, storing instructions in non-transitory memory that, when executed, cause the controller to: charge the onboard energy storage device through the dual clutch transmission via the electric machine by controlling the driveline disconnect clutch based on a vehicle speed. In a first example, of the system, the system further comprises fully opening the driveline disconnect clutch and charging the onboard energy storage device by either controlling the electric machine to a desired torque and controlling the engine to a desired speed, or by controlling the engine to a desired torque and controlling the electric machine to a desired speed, under conditions where the vehicle speed is below synchronous engine idle speed for the first, or lowest gear of the dual clutch transmission, and further responsive to an indication that the vehicle is fully stopped, and that torque modulation via the driveline disconnect clutch is not desired. A second example of the system optionally includes the first example, and further comprises slipping the driveline disconnect clutch and charging the onboard energy storage device by either controlling the electric machine to a desired torque and controlling the engine to a desired speed, or by controlling the engine to a desired torque and controlling the electric machine to a desired speed, under conditions where the vehicle speed is below synchronous engine idle speed for the first, or lowest gear of the dual clutch transmission, and further responsive to an indication that the vehicle is not fully stopped, and that torque modulation via the driveline disconnect clutch is desired. A third example of the system optionally includes any one or more or each of the first and second examples, and further comprises fully closing the driveline disconnect clutch and charging the onboard energy storage device by controlling the engine to a desired torque and controlling the electric machine to a desired torque, under conditions where the vehicle speed is below synchronous engine idle speed for the first, or lowest gear of the dual clutch transmission, and further responsive to an indication that the vehicle is not fully stopped, and that torque modulation via the driveline disconnect clutch is not desired. A fourth example of the system optionally includes any one or more or each of the first through third examples, and further comprises fully closing the driveline disconnect clutch and charging the onboard energy storage device by controlling the engine to a desired torque and controlling the electric machine to a desired torque, under conditions where the vehicle speed is above synchronous engine idle speed for the first, or lowest gear of the dual clutch transmission. A fifth example of the system optionally includes any one or more or each of the first through fourth examples, and further comprises engaging a desired gear of the dual clutch transmission via a synchronizer, and locking a clutch of the dual clutch transmission, the clutch corresponding to a gear shaft of the desired gear.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
charging an onboard energy storage device of a vehicle through a dual clutch transmission via an electric machine positioned downstream of the dual clutch transmission by producing a charging torque with an engine positioned upstream of the dual clutch transmission and controlling a driveline disconnect clutch positioned downstream of the electric machine.

2. The method of claim 1, wherein a speed of the vehicle is below a predetermined threshold, and wherein the predetermined threshold includes vehicle speed below a synchronous engine idle speed for a first, or lowest, gear of the dual clutch transmission.

3. The method of claim 1, wherein controlling the driveline disconnect clutch further comprises fully opening the driveline disconnect clutch under conditions where the vehicle is fully stopped or under conditions where a brake pedal is depressed greater than a predetermined amount.

4. The method of claim 1, wherein controlling the driveline disconnect clutch further comprises slipping the driveline disconnect clutch under conditions where the vehicle is not fully stopped, but where torque modulation via the driveline disconnect clutch is desired.

5. The method of claim 1, wherein controlling the driveline disconnect clutch further comprises fully closing the driveline disconnect clutch under conditions where the vehicle is not fully stopped, and where torque modulation via the driveline disconnect clutch is not desired.

6. The method of claim 1, further comprising controlling the electric machine to a desired torque and controlling the engine to a desired speed for charging the energy storage device.

7. The method of claim 1, further comprising controlling the engine to a desired torque and controlling the electric machine to a desired speed for charging the energy storage device.

8. The method of claim 1, further comprising controlling the engine to a desired torque and controlling the electric machine to a desired torque for charging the energy storage device.

9. The method of claim 1, further comprising engaging a desired gear of the dual clutch transmission via a corresponding synchronizer, and locking a clutch of the dual clutch transmission, the clutch corresponding to a gear shaft of the desired gear.

10. A method, comprising:
charging an onboard energy storage device of a vehicle through a dual clutch transmission via an electric machine positioned downstream of the dual clutch transmission by producing a charging torque with an engine positioned upstream of the dual clutch transmission and controlling a driveline disconnect clutch positioned downstream of the electric machine, under conditions where a speed of the vehicle is greater than a predetermined threshold.

11. The method of claim 10, further comprising engaging a first, or lowest, gear of the dual clutch transmission via a synchronizer, and locking a clutch of the dual clutch transmission, the clutch corresponding to a gear shaft of the first, or lowest, gear.

12. The method of claim 10, wherein controlling the driveline disconnect clutch further comprises locking the driveline disconnect clutch.

13. The method of claim 10, wherein the predetermined threshold includes vehicle speed above a synchronous engine idle speed for a first, or lowest, gear of the dual clutch transmission.

14. The method of claim 10, further comprising controlling the engine to a desired torque and controlling the electric machine to a desired torque for charging the energy storage device.

15. A system for a vehicle, comprising:
- an engine without an auxiliary engine starting device;
- a dual clutch transmission with a plurality of gears positioned downstream of the engine including a first, or lowest, gear of the dual clutch transmission;
- an electric machine positioned downstream of the dual clutch transmission;
- a driveline disconnect clutch positioned downstream of the electric machine;
- an onboard energy storage device; and
- a controller, storing instructions in non-transitory memory that, when executed, cause the controller to:
  - charge the onboard energy storage device through the dual clutch transmission via the electric machine by controlling the driveline disconnect clutch based on a vehicle speed.

16. The system of claim 15, further comprising fully opening the driveline disconnect clutch and charging the onboard energy storage device by either controlling the electric machine to a desired torque and controlling the engine to a desired speed, or by controlling the engine to a desired torque and controlling the electric machine to a desired speed, under conditions where the vehicle speed is below synchronous engine idle speed for the first, or lowest gear of the dual clutch transmission, and further responsive to an indication that the vehicle is fully stopped, and that torque modulation via the driveline disconnect clutch is not desired.

17. The system of claim 15, further comprising slipping the driveline disconnect clutch and charging the onboard energy storage device by either controlling the electric machine to a desired torque and controlling the engine to a desired speed, or by controlling the engine to a desired torque and controlling the electric machine to a desired speed, under conditions where the vehicle speed is below synchronous engine idle speed for the first, or lowest gear of the dual clutch transmission, and further responsive to an indication that the vehicle is not fully stopped, and that torque modulation via the driveline disconnect clutch is desired.

18. The system of claim 15, further comprising fully closing the driveline disconnect clutch and charging the onboard energy storage device by controlling the engine to a desired torque and controlling the electric machine to a desired torque, under conditions where the vehicle speed is below synchronous engine idle speed for the first, or lowest gear of the dual clutch transmission, and further responsive to an indication that the vehicle is not fully stopped, and that torque modulation via the driveline disconnect clutch is not desired.

19. The system of claim 15, further comprising fully closing the driveline disconnect clutch and charging the onboard energy storage device by controlling the engine to a desired torque and controlling the electric machine to a desired torque, under conditions where the vehicle speed is above synchronous engine idle speed for the first, or lowest gear of the dual clutch transmission.

20. The system of claim 15, further comprising engaging a desired gear of the dual clutch transmission via a synchronizer, and locking a clutch of the dual clutch transmission, the clutch corresponding to a gear shaft of the desired gear.

* * * * *